United States Patent
Armangau et al.

(10) Patent No.: US 6,792,518 B2
(45) Date of Patent: Sep. 14, 2004

(54) DATA STORAGE SYSTEM HAVING MATA BIT MAPS FOR INDICATING WHETHER DATA BLOCKS ARE INVALID IN SNAPSHOT COPIES

(75) Inventors: Philippe Armangau, Acton, MA (US); Himabindu Tummala, South Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 225 days.

(21) Appl. No.: 10/213,241

(22) Filed: Aug. 6, 2002

(65) Prior Publication Data

US 2004/0030846 A1 Feb. 12, 2004

(51) Int. Cl.[7] .............................................. G06F 12/00
(52) U.S. Cl. ..................... 711/162; 711/112; 711/156; 707/203; 707/204; 714/5
(58) Field of Search ................................ 707/203, 204; 711/112, 156, 161, 162; 714/5

(56) References Cited

U.S. PATENT DOCUMENTS

| | | | |
|---|---|---|---|
| 4,608,688 A | 8/1986 | Hansen et al. ................. 371/11 |
| 4,686,620 A | 8/1987 | Ng | |
| 4,755,928 A | 7/1988 | Johnson et al. | |
| 5,060,185 A | 10/1991 | Naito et al. | |
| 5,206,939 A | 4/1993 | Yanai et al. | |
| 5,381,539 A | 1/1995 | Yanai et al. | |
| 5,535,381 A | 7/1996 | Kopper | |
| 5,596,706 A | 1/1997 | Shimazaki et al. .... 395/182.04 |
| 5,673,382 A | 9/1997 | Cannon et al. | |
| 5,737,747 A | 4/1998 | Vishlitzky et al. .......... 711/118 |
| 5,742,792 A | 4/1998 | Yanai et al. | |
| 5,819,292 A | 10/1998 | Hitz et al. .................... 707/203 |
| 5,829,046 A | 10/1998 | Tzelnic et al. .............. 711/162 |
| 5,829,047 A | 10/1998 | Jacks et al. .................. 711/162 |
| 5,835,954 A | 11/1998 | Duyanovich et al. ....... 711/162 |
| 5,915,264 A | 6/1999 | White et al. ................. 711/168 |
| 5,923,878 A | 7/1999 | Marsland ..................... 395/704 |
| 5,974,563 A | 10/1999 | Beeler, Jr. ...................... 714/5 |
| 6,061,770 A * | 5/2000 | Franklin ...................... 711/162 |
| 6,076,148 A | 6/2000 | Kedem ........................ 711/162 |
| 6,078,929 A | 6/2000 | Rao ............................. 707/200 |
| 6,269,431 B1 | 7/2001 | Dunham ...................... 711/162 |
| 6,279,011 B1 | 8/2001 | Muhlestein .................. 707/204 |
| 6,434,681 B1 | 8/2002 | Armangau ................... 711/162 |
| 6,618,794 B1 * | 9/2003 | Sicola et al. ................. 711/154 |
| 2003/0079102 A1 * | 4/2003 | Lubbers et al. ............. 711/202 |
| 2003/0158873 A1 * | 8/2003 | Sawdon et al. ............. 707/204 |

OTHER PUBLICATIONS

Mendel Rosenblum and John K. Ousterhout, "The Design and Implementation of a Log–Structured File System," *ACM Transactions on Computer Systems*, vol. 10, No. 1, Feb. 1992, pp. 26–52.

(List continued on next page.)

*Primary Examiner*—Nasser Moazzami
*Assistant Examiner*—Christian P. Chace
(74) *Attorney, Agent, or Firm*—Novak Druce LLP; Richard C. Auchterlonie

(57) ABSTRACT

In a data storage system providing access to a production dataset and snapshot copies of the production dataset, a production meta bit map identifies blocks of storage that are invalid in the production dataset. If a block in the production dataset is invalid when a snapshot copy is being made, then there is no need to copy the block to storage for the snapshot before writing to the block. Moreover, if a block in the production dataset supporting a snapshot copy is dynamically invalidated, it may be kept in the production dataset until it is written to. For this purpose, a respective snapshot copy of the meta bit map is made and kept with each of the snapshot datasets, and the snapshot copies of the meta bit map are merged in order to indicate the blocks that are invalid for all of the snapshots.

46 Claims, 33 Drawing Sheets

OTHER PUBLICATIONS

Fred Douglis and John Ousterhout, "Log–Structured File Systems," in Spring COMPCON89, Feb. 27–Mar. 31, 1989, *Thirty–Fourth IEEE Computer Society International Conference*, San Francisco, CA, pp. 124–129.

David A. Patterson, Peter Chen, Garth Gibson, and Randy H. Katz, "Introduction to Redundant Arrays of Inexpensive Disks (RAID)," in Spring COMPCON89, Feb. 27–Mar. 31, 1989, *Thirty–Fourth IEEE Computer Society International Conference*, San Francisco, CA, pp. 112–117.

D.L. Burkes and R.K. Treiber, "Design Approaches for Real–Time Transaction Processing Remote Site Recovery," in Spring COMPCON90, Feb. 26–Mar. 2, 1990, *Thirty–Fifth IEEE Computer Society International Conference*, San Francisco, CA, pp. 568–572.

"VERITAS NetBackup and Storage Migrator" http://www.sun.com/stora . . . /netbackup.html; $sessionid$QEOQTDQAAC2QHAMTA1FU5Y, published at least as early as Oct. 28, 2000, 5 pages.

R. Stager and D. Hitz, Internet Draft, filename "draft–stager–iquard–netapp–backup–0.5.txt" Network Data Management Protocol (NDMP), last update Oct. 12, 1999, pp. 1–73.

"Network Data Management Protocol (NDMP)," http://www.ndmp.org/info/; NDMP White Paper, http://www.ndmp.org/info/technology/wp.html; "Protocol Specification Summary, Document Version: 1.7.2S," http://www.ndmp.org/info/spec_summary.html; "Legato Systems Embraces the NDMP Standard: Legato Networker Software to be NDMP Compliant in Q3," http://www–ftp.legata.com/News/Press/PR209.html; published at least as early as Oct. 11, 1999, 17 pages.

"RFC 1094—NFS: Network File System Protocol Specification," Network Working Group, Request for Comments: 1094, Sun Microsystems, Inc., Mar. 1989, pp. 1–27, http://rfc.sunsite.dk/rfc/rfc1094.html.

Uresh Vahalia, *Unix Internals—The New Frontiers*, Prentice–Hall Inc., New Jersey, 1996, Chapter 9, File System Implementations, pp. 261–289.

Brian W. Kerningham and Rob Pike, *The UNIX Programming Environment*, Prentice–Hallz Inc., New Jersey, 1984, Chapter 2, The File System, pp. 41–70.

Koop, P., "Replication at Work. (four companies use Oracle and Sybase replication servers to solve business problems)," DBMS, vol. 8, No. 3, p. 54(4), Mar. 1995.

Remote Mirroring Technical White Paper, Copyright 1994–2002 Sun Microsystems, published at least as early as May 17, 2002 at sun.com, 25 pages.

EMC TimeFinder Product Description Guide, EMC Corporation, Hopkinton, MA, 1998, pp. 1–31.

Leveraging SnapView/IP in Oracle8i Environments with the CLARiiON IP4700 File Server, Engineering White Paper, EMC Corporation, Hopkinton, MA, Feb. 13, 2002, pp. 1–16.

Using EMC CLARiiON FC4700 and SnapView with Oracle 8i, Engineering White Paper, EMC Corporation, Hopkinton, MA, Mar. 4, 2002, pp. 1–22.

Disaster Recovery Guidelines for using HP SureStore E XP256, Continuous Access XP with Oracle Databases Rev 1.03, Hewlett–Packard Company, Palo Alto, CA, May 2000, pp. 1–28.

Enterprise Volume Manager and Oracle8 Best Practices, Compaq White Paper, Compaq Computer Corporation, Dec. 1999, pp. 1–11.

VERITAS Database Edition for Oracle, Guidelines for Using Storage Checkpoint and Storage Rollback with Oracle Databases, Veritas Software Corporation, Mountain View, CA, Aug. 2001, pp. 1–16.

VERITAS Volume Replication and Oracle Databases, A Solutions White Paper, Veritas Software Corporation, Mountain View, CA, May 29, 2000, pp. 1–31.

Nabil Osorio and Bill Lee, Guidelines for Using Snapshot Storage Systems for Oracle Databases, Oracle Corporation, Oct. 2001, pp. 12.

* cited by examiner

DATA STORAGE SYSTEM HAVING MATA BIT MAPS FOR INDICATING WHETHER DATA BLOCKS ARE INVALID IN SNAPSHOT COPIES

FIELD OF THE INVENTION

The present invention relates generally to computer data storage, and more particularly, to a snapshot copy facility for a data storage system.

BACKGROUND OF THE INVENTION

Snapshot copies of a dataset such as a file or storage volume have been used for a variety of data processing and storage management functions such as storage backup, transaction processing, and software debugging.

A known way of making a snapshot copy is to respond to a snapshot copy request by invoking a task that copies data from a production dataset to a snapshot copy dataset. A host processor, however, cannot write new data to a storage location in the production dataset until the original contents of the storage location have been copied to the snapshot copy dataset.

Another way of making a snapshot copy of a dataset is to allocate storage to modified versions of physical storage units, and to retain the original versions of the physical storage units as a snapshot copy. Whenever the host writes new data to a storage location in a production dataset, the original data is read from the storage location containing the most current version, modified, and written to a different storage location. This is known in the art as a "log structured file" approach. See, for example, Douglis et al. "Log Structured File Systems," COMPCON 89 Proceedings, Feb. 27–Mar. 3, 1989, IEEE Computer Society, p. 124–129, incorporated herein by reference, and Rosenblum et al., "The Design and Implementation of a Log-Structured File System," ACM Transactions on Computer Systems, Vol. 1, February 1992, p. 26–52, incorporated herein by reference.

Yet another way of making a snapshot copy is for a data storage system to respond to a host request to write to a storage location of the production dataset by checking whether or not the storage location has been modified since the time when the snapshot copy was created. Upon finding that the storage location of the production dataset has not been modified, the data storage system copies the data from the storage location of the production dataset to an allocated storage location of the snapshot copy. After copying data from the storage location of the production dataset to the allocated storage location of the snapshot copy, the write operation is performed upon the storage location of the production dataset. For example, as described in Keedem U.S. Pat. No. 6,076,148 issued Jun. 13, 2000, assigned to EMC Corporation, and incorporated herein by reference, the data storage system allocates to the snapshot copy a bit map to indicate storage locations in the production dataset that have been modified. In this fashion, a host write operation upon a storage location being backed up need not be delayed until original data in the storage location is written to secondary storage.

Backup and restore services are a conventional way of reducing the impact of data loss from the network storage. To be effective, however, the data should be backed up frequently, and the data should be restored rapidly from backup after the storage system failure. As the amount of storage on the network increases, it is more difficult to maintain the frequency of the data backups, and to restore the data rapidly after a storage system failure.

In the data storage industry, an open standard network backup protocol has been defined to provide centrally managed, enterprise-wide data protection for the user in a heterogeneous environment. The standard is called the Network Data Management Protocol (NDMP). NDMP facilitates the partitioning of the backup problem between backup software vendors, server vendors, and network-attached storage vendors in such a way as to minimize the amount of host software for backup. The current state of development of NDMP can be found at the Internet site for the NDMP organization. Details of NDMP are set out in the Internet Draft Document by R. Stager and D. Hitz entitled "Network Data Management Protocol" document version 2.1.7 (last update Oct. 12, 1999) incorporated herein by reference.

SUMMARY OF THE INVENTION

In accordance with one aspect of the invention, there is provided a data storage system for providing access to a production dataset and at least one snapshot dataset. The snapshot dataset is the state of the production dataset at a point in time when the snapshot dataset was created. The data storage system includes storage for storing data of the production dataset and the snapshot dataset. The data storage system is programmed for maintaining an indication of invalid blocks of the storage that are allocated to the production dataset. The data storage system is also programmed for performing a write access upon a specified block of the storage allocated to the production dataset by checking whether or not the specified block is indicated to be invalid, and if the specified block is not indicated to be invalid, copying the specified block to the snapshot dataset and then writing to the specified block, and if the specified block is indicated to be invalid, writing to the specified block without copying the specified block to the snapshot dataset.

In accordance with another aspect, the invention provides a data storage system for providing access to a production dataset and a plurality of snapshot datasets. Each snapshot dataset is the state of the production dataset at a point in time when the snapshot dataset was created. The data storage system includes storage for storing data of the production dataset and the snapshot datasets. The data storage system is programmed for maintaining an indication of invalid blocks of the storage that are allocated to the production dataset, and for maintaining, for each snapshot dataset, a snapshot copy of the indication of invalid blocks of the storage that were allocated to the production dataset at the point of time when the snapshot dataset was created. The data storage system is also programmed for performing a write access upon a specified block of the storage allocated to the production dataset by checking whether or not the specified block is not indicated to be invalid in any of the snapshot copies of the indication of invalid blocks that were allocated to the production dataset at the point in time when each snapshot dataset was created, and if the specified block is not indicated to be invalid in any of the snapshot copies of the indication of invalid blocks that were allocated to the production dataset at the point in time when each snapshot dataset was created, copying the specified block to at least the most recent snapshot dataset and then writing to the specified block, and if the specified block is indicated to be invalid in the production dataset and in all of the snapshot copies of the indication of invalid blocks that were allocated to the production dataset at the point in time when each snapshot dataset was created, writing to the specified block without copying the specified block to at least the most recent snapshot dataset.

In accordance with still another aspect, the invention provides a data storage system for providing access to a production dataset and a plurality of snapshot datasets. Each snapshot dataset is the state of the production dataset at a point in time when the snapshot dataset was created. The data storage system includes storage for storing data of the production dataset and the snapshot datasets. The data storage system is programmed for maintaining a meta bit map indicating invalid blocks of the storage that are allocated to the production dataset, and for maintaining, for each snapshot dataset, a snapshot copy of the meta bit map indicating invalid blocks of the storage that were allocated to the production dataset at the point of time when the snapshot dataset was created. The data storage system is further programmed for using the snapshot copies of the meta bit map for deciding whether or not to copy blocks from the storage of the production dataset to storage of the snapshot datasets for saving the blocks to support the snapshot datasets.

In accordance with yet another aspect, the invention provides a method of operating a data storage system for providing access to a production dataset and at least one snapshot dataset. The snapshot dataset is the state of the production dataset at a point in time when the snapshot dataset was created. The data storage system includes storage for storing data of the production dataset and the snapshot dataset. The method includes maintaining an indication of invalid blocks of the storage that are allocated to the production dataset. The method further includes performing a write access upon a specified block of the storage allocated to the production dataset by checking whether or not the specified block is indicated to be invalid, and if the specified block is not indicated to be invalid, copying the specified block to the snapshot dataset and then writing to the specified block, and if the specified block is indicated to be invalid, writing to the specified block without copying the specified block to the snapshot dataset.

In accordance with yet still another aspect, the invention provides a method of operating a data storage system for providing access to a production dataset and a plurality of snapshot datasets. Each snapshot dataset is the state of the production dataset at a point in time when the snapshot dataset was created. The data storage system includes storage for storing data of the production dataset and the snapshot datasets. The method includes maintaining an indication of invalid blocks of the storage that are allocated to the production dataset, and for maintaining, for each snapshot dataset, a snapshot copy of the indication of invalid blocks of the storage that were allocated to the production dataset at the point of time when the snapshot dataset was created. The method further includes performing a write access upon a specified block of the storage allocated to the production dataset by checking whether or not the specified block is not indicated to be invalid in any of the snapshot copies of the indication of invalid blocks that were allocated to the production dataset at the point in time when each snapshot dataset was created, and if the specified block is not indicated to be invalid in any of the snapshot copies of the indication of invalid blocks that were allocated to the production dataset at the point in time when each snapshot dataset was created, copying the specified block to at least the most recent snapshot dataset and then writing to the specified block, and if the specified block is indicated to be invalid in the production dataset and in all of the snapshot copies of the indication of invalid blocks that were allocated to the production dataset at the point in time when each snapshot dataset was created, writing to the specified block without copying the specified block to at least the most recent snapshot dataset.

In accordance a final aspect, the invention provides a method of operating a data storage system for providing access to a production dataset and a plurality of snapshot datasets. Each snapshot dataset is the state of the production dataset at a point in time when the snapshot dataset was created. The data storage system includes storage for storing data of the production dataset and the snapshot datasets. The method includes maintaining a meta bit map indicating invalid blocks of the storage that are allocated to the production dataset, and maintaining, for each snapshot dataset, a snapshot copy of the meta bit map indicating invalid blocks of the storage that were allocated to the production dataset at the point of time when the snapshot dataset was created. The method further includes using the snapshot copies of the meta bit map for deciding whether or not to copy blocks from the storage of the production dataset to storage of the snapshot datasets for saving the blocks to support the snapshot datasets.

BRIEF DESCRIPTION OF THE DRAWINGS

Additional features and advantages of the invention will be described below with reference to the drawings, in which.

Figure 1:
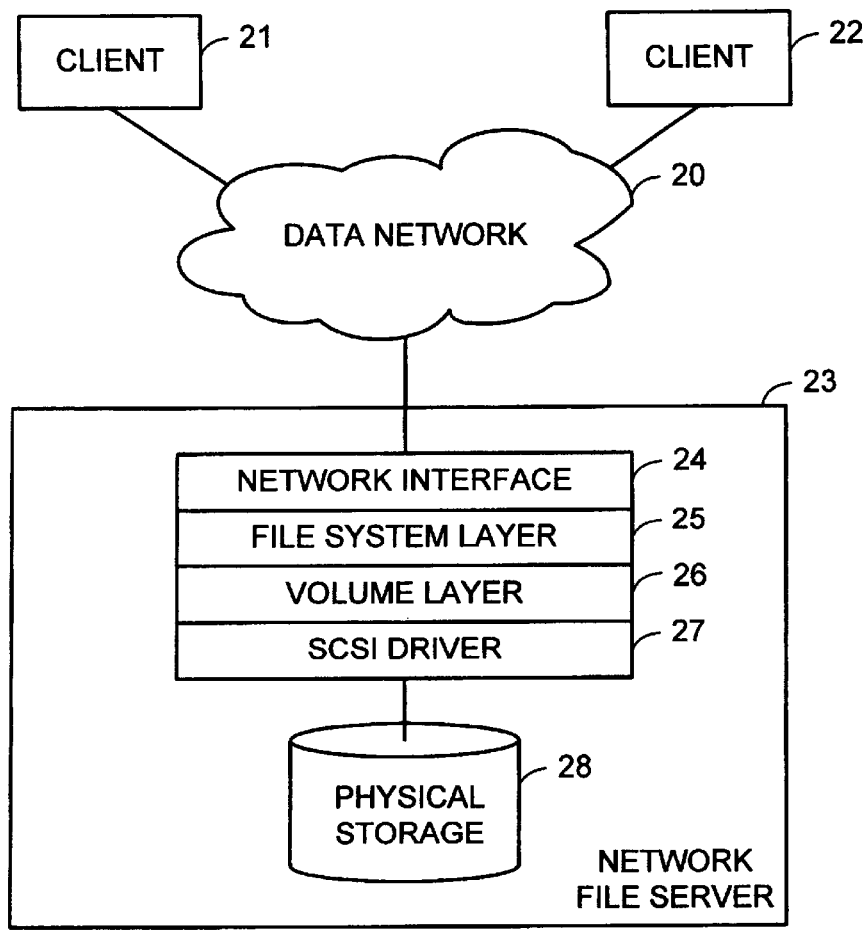
FIG. 1 is a block diagram of a data network including clients that share a network file server.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

I. A Prior-Art Multiple Snapshot Copy Facility for a Network File Server

With reference to FIG. 1, there is shown a data network 20 linking clients 21, 22 to a network file server 23. The network file server has a network interface 24 for coupling to the data network, a file system layer 25 for organizing data into a hierarchical structure of files and directories, a volume layer 26 for organizing the data into logical volumes of data blocks, a Small Computer System Interface (SCSI) driver 27, and physical storage 28 linked to the logical volume layer 26 through the SCSI driver 27.

Figure 2:
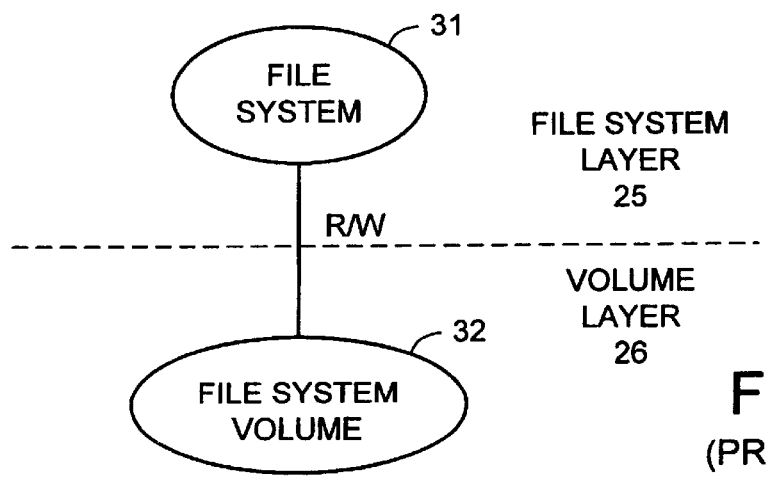
FIG. 2 shows a file system in a file system layer and a file system volume in a volume layer in the network file server of FIG. 1.

FIG. 2 shows that the file system layer 25 includes a file system object 31, which is supported by a file system volume 32 in the volume layer 26. When a client accesses the file system object 31, the file system object 31 reads or writes an extent of data blocks from the file system volume 32. Each data block, for example, is eight kilobytes in size.

Figure 3:
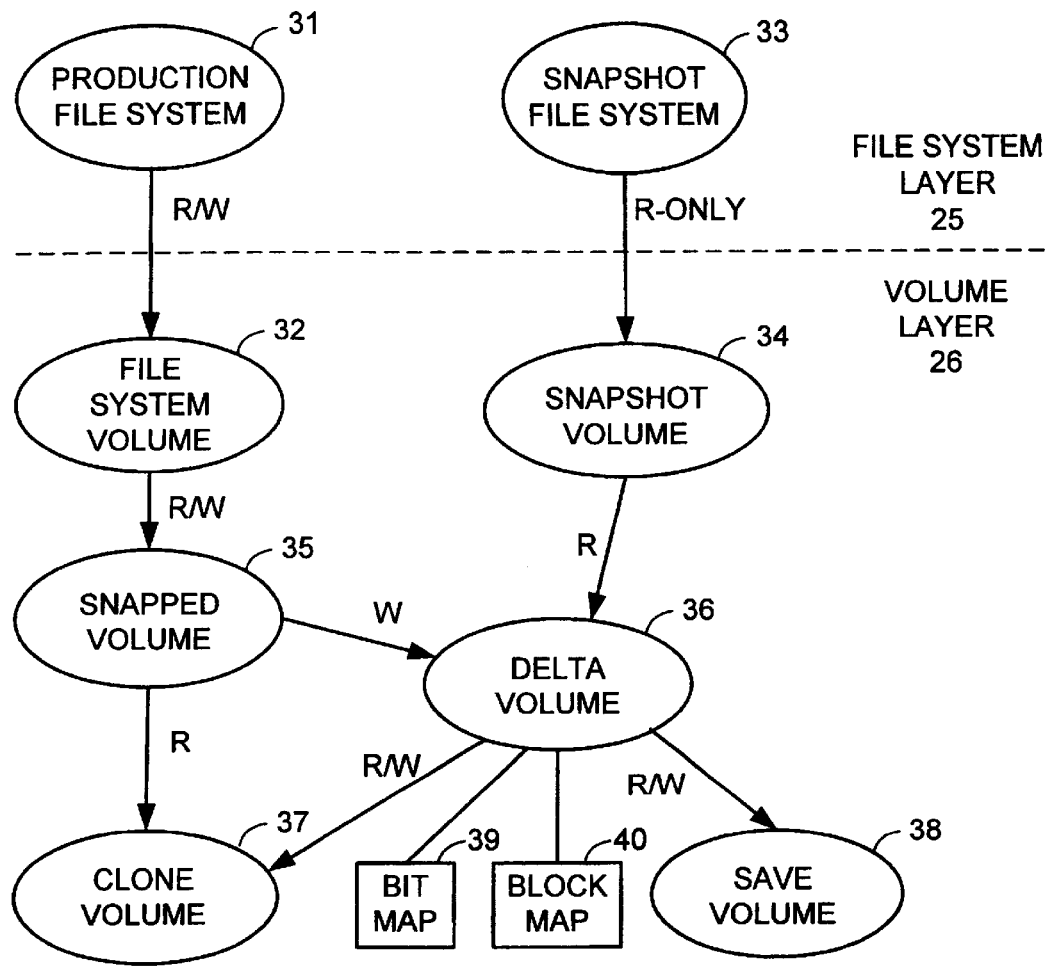
FIG. 3 shows objects in a volume layer to support a production file system and a snapshot file system in the file system layer of the network file server of FIG. 1.

FIG. 3 shows an organization of objects in the volume layer 26 to support a production file system 31 having a corresponding snapshot file system 33. The content of the snapshot file system is the state of the production file system at a particular point in time when the snapshot file system was created. The production file system 31 is supported by read/write access to a file system volume 32. A snapshot file system 33 provides read only access to a snapshot volume 34.

Additional objects in the volume layer 26 of FIG. 3 permit the content of the snapshot file system to be created during concurrent read/write access to the production file system 31. The file system volume 32 is supported by a snapped volume 35 having read access to a clone volume 37 and write access to a delta volume 36. The delta volume 36 has read/write access to the clone volume 37 and read/write access to a save volume 38.

In the organization of FIG. 3, the actual data is stored in blocks in the clone volume 37 and the save volume 38. The delta volume 36 also accesses information stored in a bit map 39 and a block map 40. The bit map 39 indicates which blocks in the clone volume 37 have prior versions in the save volume 38. In other words, for read only access to the snapshot file system, the bit map 39 indicates whether the delta volume should read each block from the clone volume 37 or from the save volume 38. For example, the bit map includes a bit for each block in the clone volume 37. The bit is clear to indicate that there is no prior version of the block in the save volume 38, and the bit is set to indicate that there is a prior version of the block in the save volume 38.

Consider, for example, a production file system 31 having blocks a, b, c, d, e,f, g, and h. Suppose that when the snapshot file system 33 is created, the blocks have values a0, b0, c0, d0, e0, f0, g0, and h0. Thereafter, read/write access to the production file system 31 modifies the contents of blocks a and b, by writing new values a1 and a2 into them. At this point, the following contents are seen in the clone volume 37 and in the save volume 38:

Clone Volume: a1, b1, c0, d0, e0, f0, g0, h0
Save Volume: a0, b0

From the contents of the clone volume 37 and the save volume 38, it is possible to construct the contents of the snapshot file system 33. When reading a block from the snapshot file system 33, the block is read from the save volume 38 if found there, else it is read from the clone volume 37.

In order to reduce the amount of storage allocated to the save volume 38, the storage blocks for the save volume are dynamically allocated on an as-needed basis. Therefore, the address of a prior version of a block stored in the save volume may differ from the address of a current version of the same block in the clone volume 37. The block map 40 indicates the save volume block address corresponding to each clone volume block address having a prior version of its data stored in the save volume.

Figure 4:
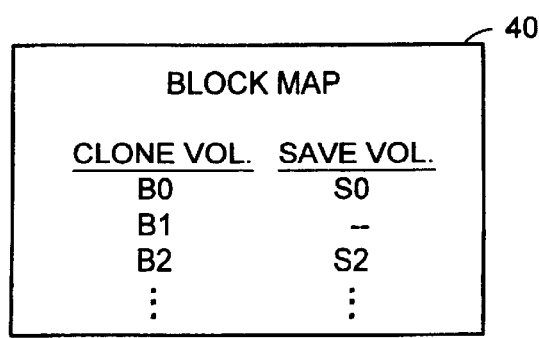
FIG. 4 shows in more detail the block map introduced in FIG. 3.

FIG. 4 shows the block map 40 in greater detail. The block map 40 is a table indexed by the production volume block address (Bi). The table has an entry for each block in the clone volume, and each entry is either invalid if no save volume block has been allocated to the block in the clone volume, or if valid, the entry contains the corresponding save volume block address (Si) of the save volume block containing data copied from the corresponding block in the clone volume.

Figure 5:
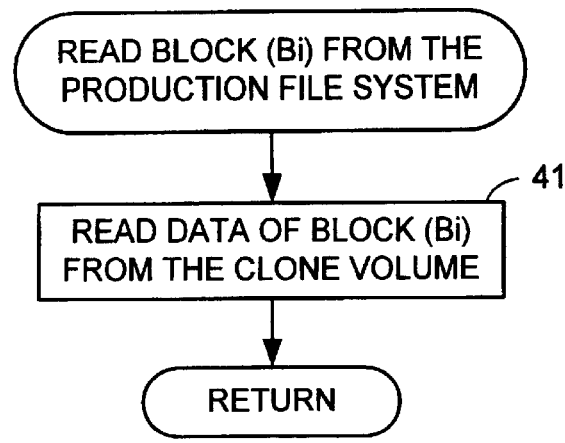
FIG. 5 is a flowchart of a procedure for reading a specified data block from the production file system in the network file server.

FIG. 5 shows a procedure for reading a specified block of data from the production file system. In step 41, the specified block of data is read from the clone volume, and execution returns.

Figure 6:
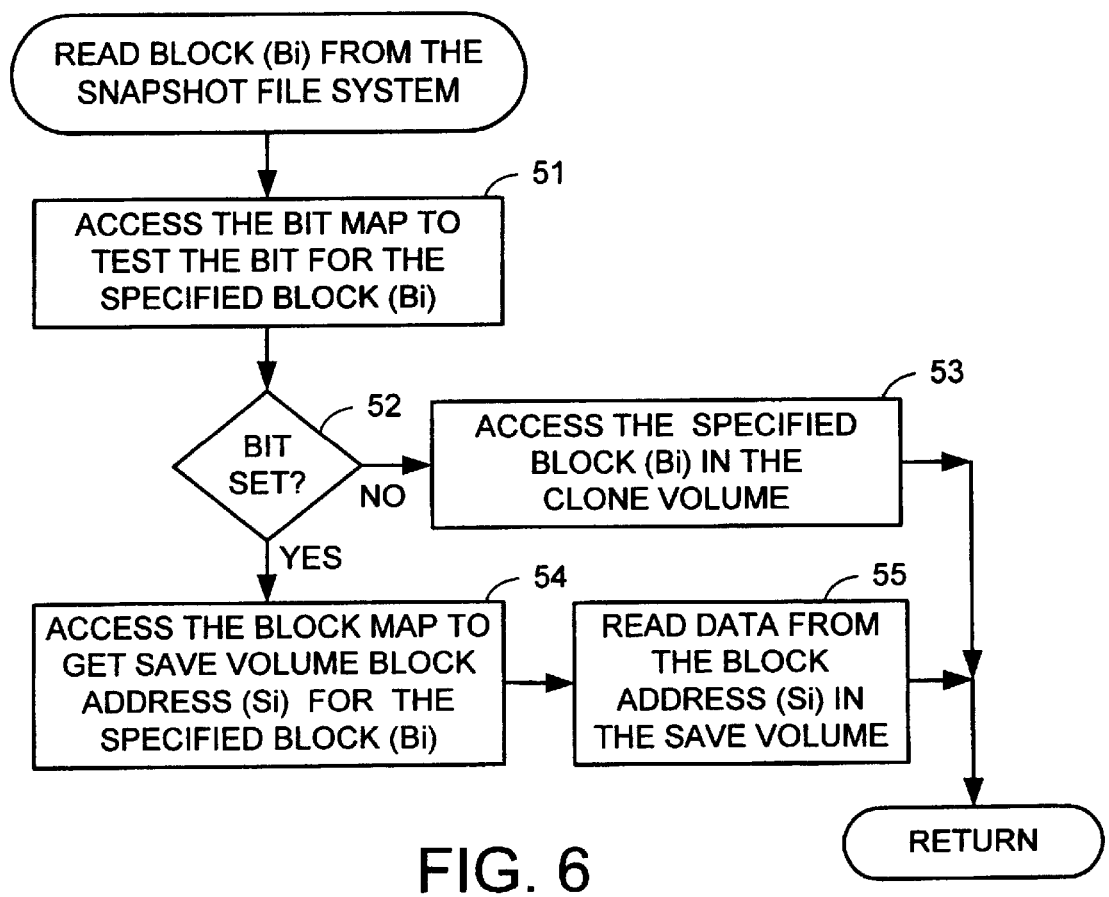
FIG. 6 is a flowchart of a procedure for reading a specified block from the snapshot file system in the network file server.

FIG. 6 shows a procedure for reading a specified block from the snapshot file system. In a first step 51, the bit map is accessed to test the bit for the specified block. If this bit is set, then in step 52 execution branches to step 53 to access the specified block in the clone volume, and then execution returns.

If in step 52 the bit is set, then execution continues to step 54. In step 54, the block map is accessed to get the save volume block address (Si) for the specified block (Bi). Then in step 55, the data is read from the block address (Si) in the save volume, and execution returns.

Figure 7:
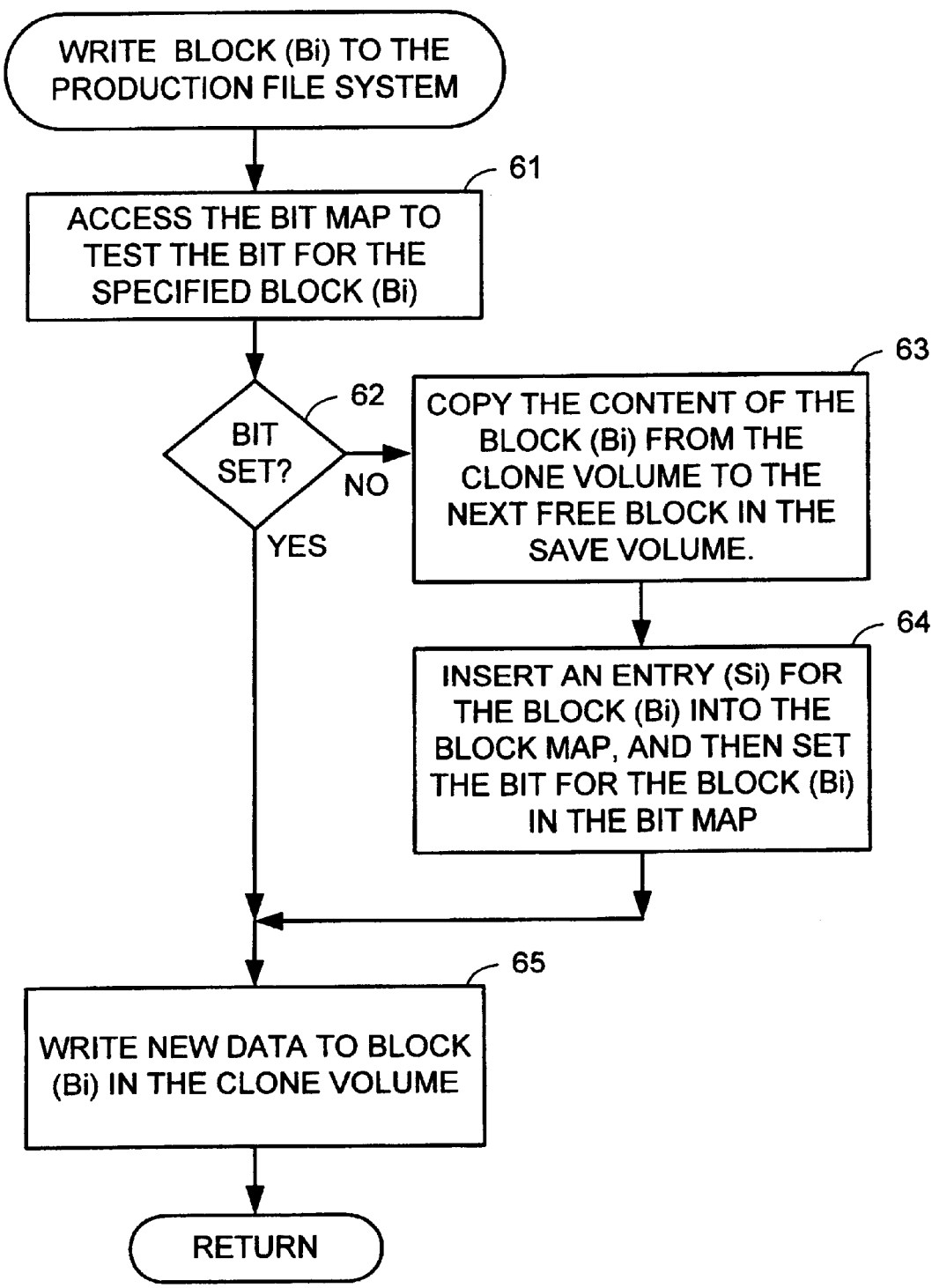
FIG. 7 is a flowchart of a procedure for writing a specified block to the production file system in the network file server.

FIG. 7 shows a procedure for writing a specified block (Bi) of data to the production file system. In a first step 61, the bit map is accessed to test the bit for the specified block (Bi). In step 62, if the bit is not set, then execution branches to step 63. In step 63, the content of the specified block (Bi) is copied from the clone volume to the next free block in the save volume. The copying can be done by copying data from the physical storage location of the specified block (Bi) in the clone volume to the physical storage location of the next free block in the save volume, or the copying can be done by moving a pointer to the physical location of the data for the specified block (Bi) in the clone volume from a logical-to-physical map entry for the specified block (Bi) in the clone volume to a logical-to-physical map entry for the next free block in the save volume. Next in step 64, the save volume block address (Si) of this next free block is inserted into the entry in the block map for the block (Bi), and then the bit for the block (Bi) is set in the bit map. After step 64, execution continues to step 65 to write the new data to the block (Bi) in the clone volume. Execution also continues from step 62 to step 65 if the tested bit is in a set state. In step 65, the new data is written to the block (Bi) in the clone volume. After step 65, execution returns.

Figure 8:
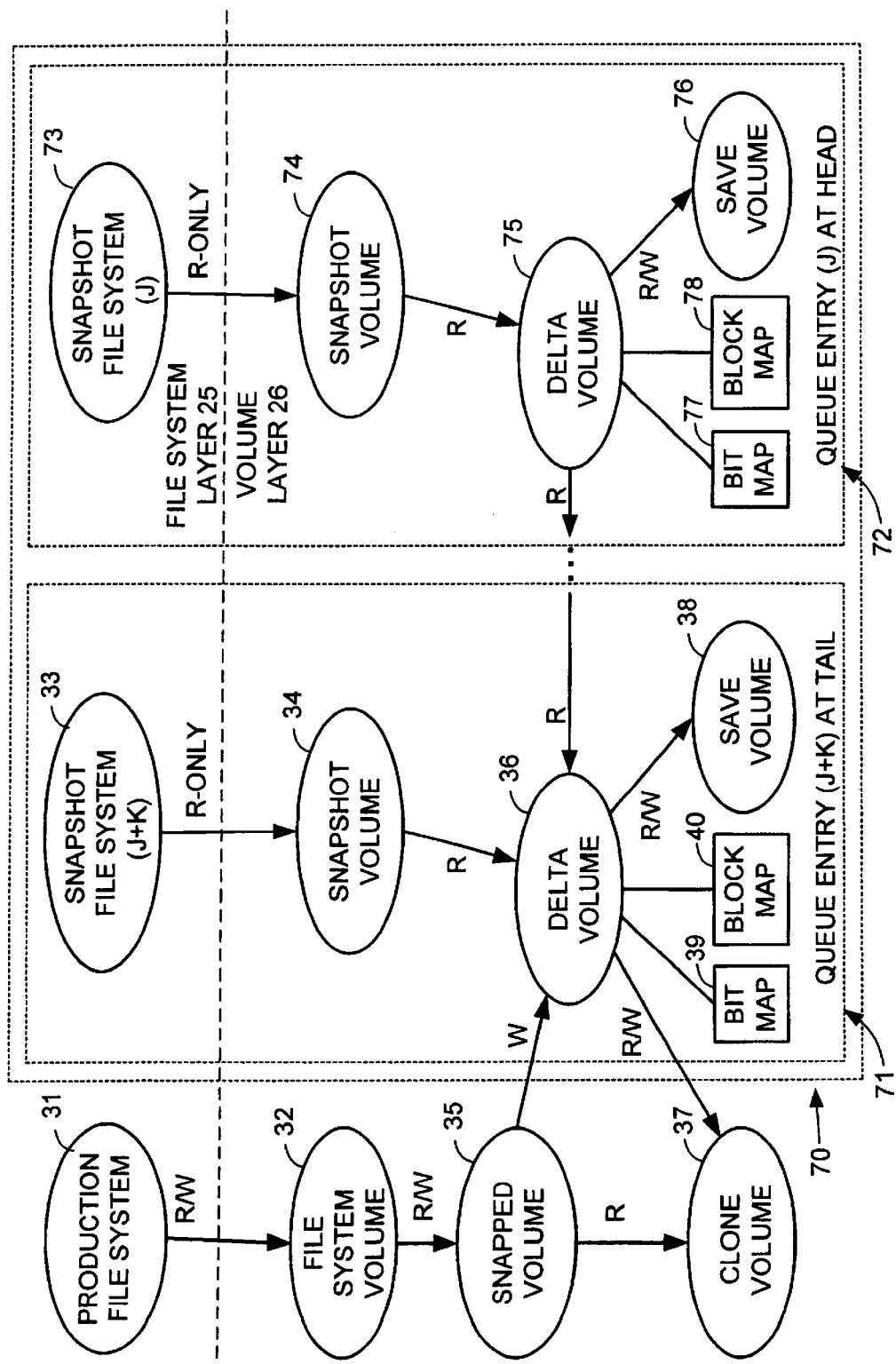
FIG. 8 shows objects in the network file server for maintaining multiple snapshots of the production file system.

FIG. 8 shows the organization of a snapshot queue 70 maintaining multiple snapshot file systems created at different respective points in time from the production file system 31. In particular, the snapshot queue 70 includes a queue entry (J+K) at the tail 71 of the queue, and a queue entry (J) at the head 72 of the queue 72. In this example, the snapshot file system 33, the snapshot volume 34, the delta volume 36, the save volume 38, the bit map 39, and the block map 40 are all located in the queue entry at the tail 71 of the queue. The queue entry at the head of the queue 72 includes similar objects; namely, a snapshot file system (J) 73, a snapshot volume 74, a delta volume 75, a save volume 76, a bit map 77, and a block map 78.

The network file server may respond to a request for another snapshot of the production file system 31 by allocating the objects for a new queue entry, and inserting the new queue entry at the tail of the queue, and linking it to the snap volume 35 and the clone volume 37. In this fashion, the save volumes 38, 76 in the snapshot queue 71 are maintained in a chronological order of the respective points in time when the snapshot file systems were created. The save volume 76 supporting the oldest snapshot file system 73 resides at the head 72 of the queue, and the save volume 38 supporting the youngest snapshot file system 33 resides at the tail 71 of the queue.

Figure 9:
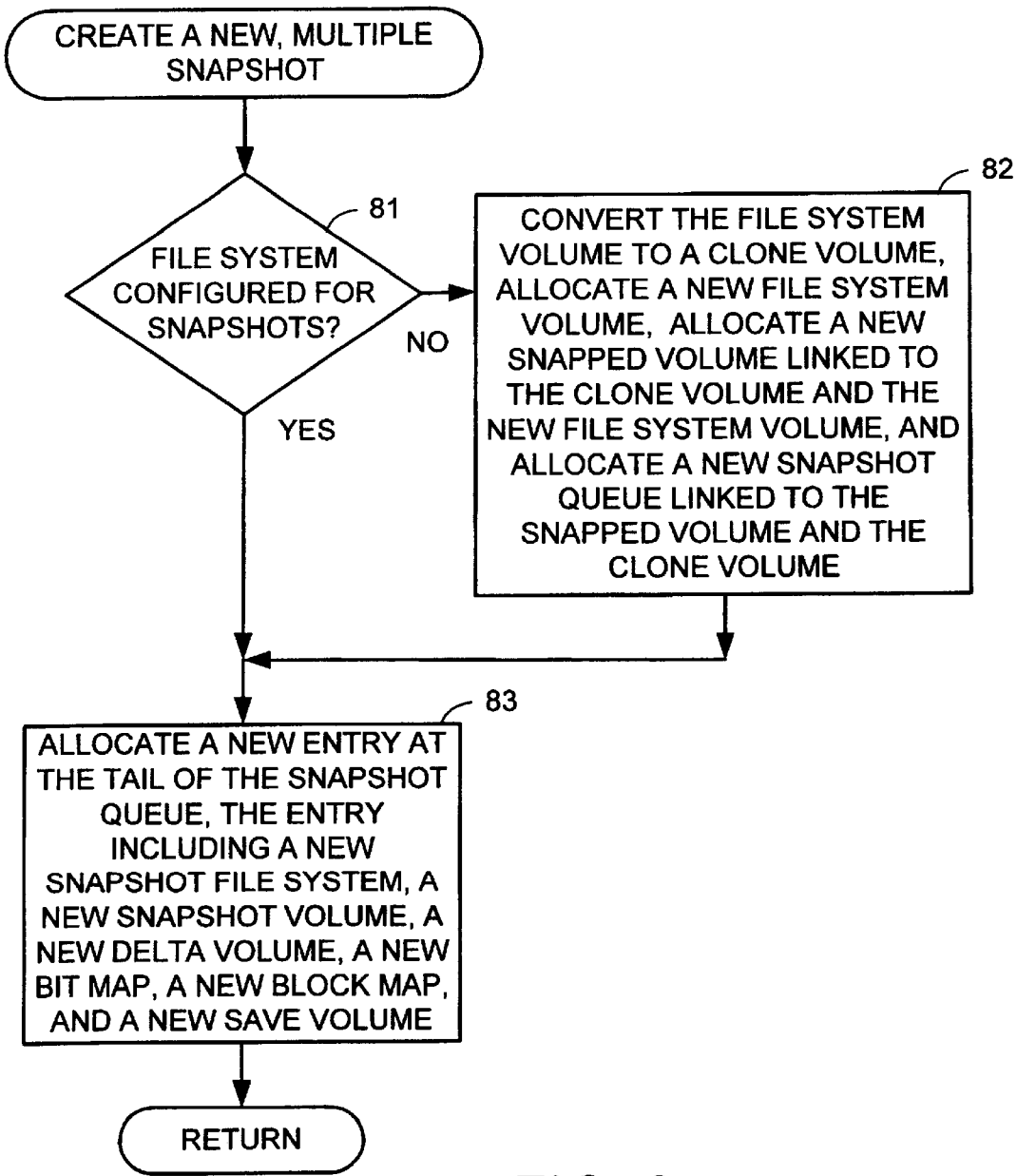
FIG. 9 is a flowchart of a procedure for creating a new snapshot in the network file server when multiple snapshots are organized as shown in FIG. 8.

FIG. 9 shows a procedure for creating a new, multiple snapshot in the organization of FIG. 8. In the first step 81 of FIG. 9, execution branches depending upon whether or not the file system has already been configured for supporting snapshots. If the file system has not been configured for supporting snapshots, then only the file system objects in FIG. 2 will be present. Otherwise, there will at least be a snapped volume (35 in FIG. 8) and a clone volume (37 in FIG. 8) associated with the file system.

If in step 81 the file system has not been configured to support snapshots, then execution branches to step 82. In step 82, the data blocks of the original file system volume (32 in FIG. 2) are configured into the clone volume (37 in FIG. 8). A new file system volume is allocated, a new snapped volume is allocated and linked to the clone volume and the new file system volume, and a new snapshot queue is allocated and linked to the snapped volume and the clone volume. Execution continues from step 82 to step 83. Execution also continues from step 81 to step 83 if the file system has already been configured to support snapshots. In step 83 a new entry is allocated at the tail of the snapshot queue. The new entry includes a new snapshot volume, a new delta volume, a new bit map, a new block map, and a new save volume. Upon the successful creation of the new snapshot file system, the new snapshot file system is mounted on the file server. Also during this step, write access on the primary file system is paused, the primary file system is flushed, the snapshot copy process is initiated, and write access on the primary file system is resumed. Read access to the primary file system need not be paused.

Figure 10:
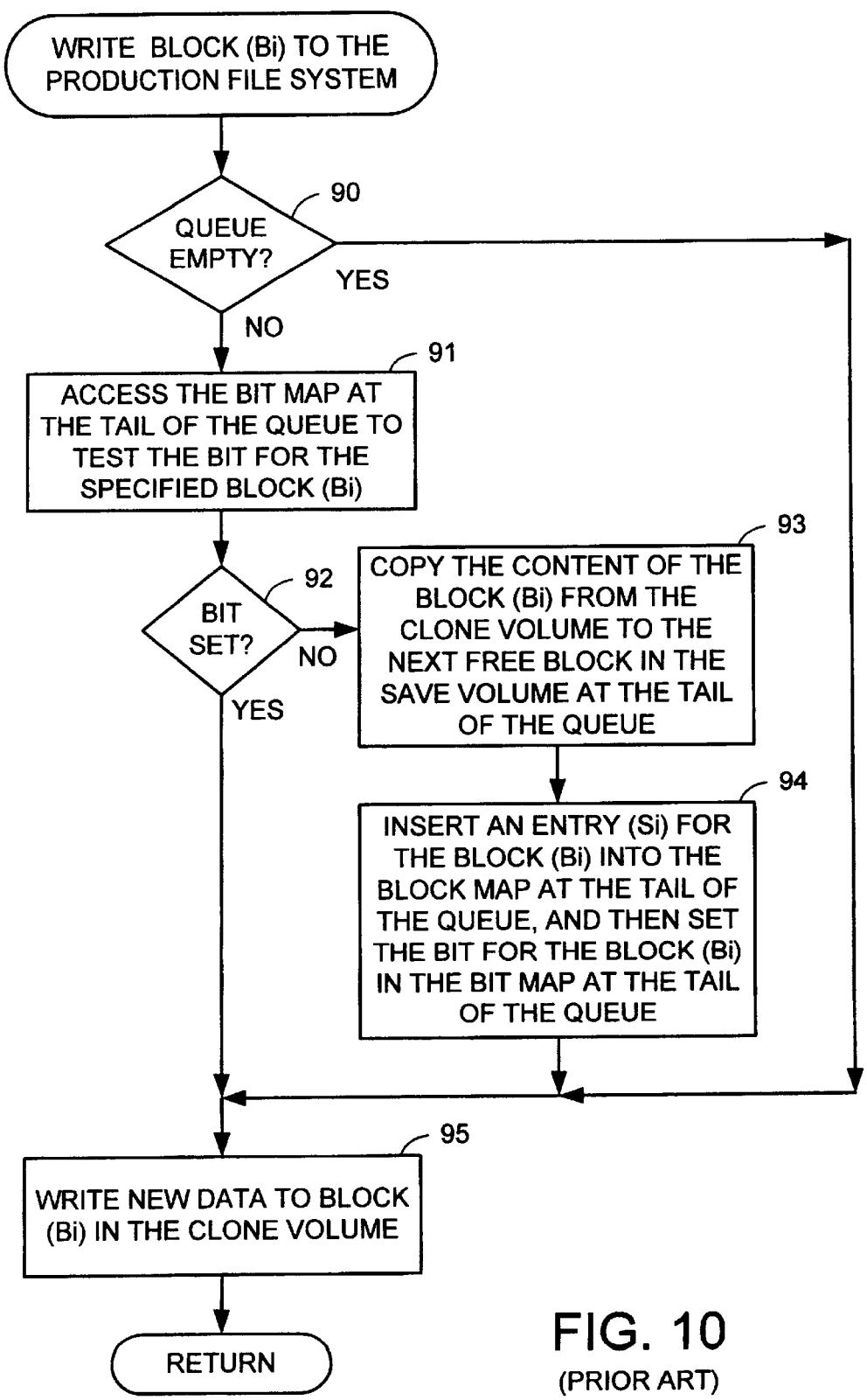
FIG. 10 is a flowchart of a procedure for writing a specified data block to the production file system when multiple snapshots are organized as shown in FIG. 8.

FIG. 10 shows a procedure for writing a specified block (Bi) to the production file system. In step 90, if the snapshot queue is not empty, execution continues to step 91. In step 91, the bit map at the tail of the snapshot queue is accessed in order to test the bit for the specified block (Bi). Then in step 92, if the bit is not set, execution branches to step 93. In step 93, the content of the specified block (Bi) is copied from the clone volume to the next free block in the save volume at the tail of the snapshot queue. Execution continues from step 93 to step 94. In step 94, the save volume block address (Si) of the free block is inserted into the entry for the block (Bi) in the block map at the tail of the queue, and then the bit for the block (Bi) is set in the bit map at the tail of the queue. After step 94, execution continues to step 95. Execution also continues to step 95 from step 92 if the tested bit is found to be set. Moreover, execution continues to step 95 from step 90 if the snapshot queue is empty. In step 95, new data is written to the specified block (Bi) in the clone volume, and then execution returns.

Figure 11:
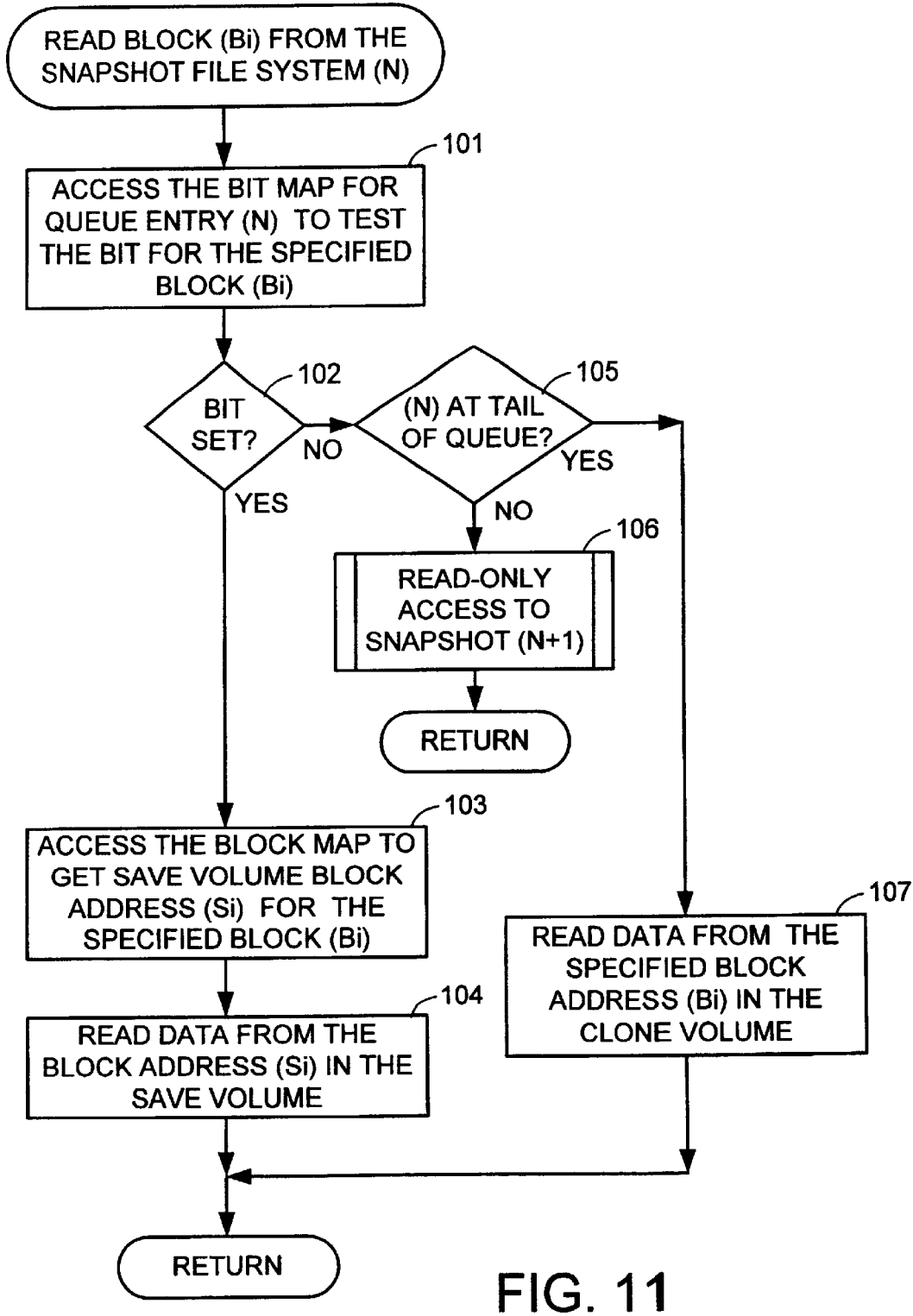
FIG. 11 is a flowchart of a procedure for reading a specified data block from a specified snapshot of the production file system when the snapshots are organized as shown in FIG. 8.

FIG. 11 shows a procedure for reading a specified block (Bi) from a specified snapshot file system (N). In the first step 101, the bit map is accessed for the queue entry (N) to test the bit for the specified block (Bi). Then in step 102, if the tested bit is set, execution continues to step 103. In step 103, the block map is accessed to get the save volume block address (Si) for the specified block (Bi). Then in step 104 the data is read from the block address (Si) in the save volume, and then execution returns.

If in step 102 the tested bit is not set, then execution branches to step 105. In step 105, if the specified snapshot (N) is not at the tail of the snapshot queue, then execution continues to step 106 to perform a recursive subroutine call upon the subroutine in FIG. 11 for read-only access to the snapshot (N+1). After step 106, execution returns.

If in step 105 the snapshot (N) is at the tail of the snapshot queue, then execution branches to step 107. In step 107, the data is read from the specified block (Bi) in the clone volume, and execution returns.

Figure 12:
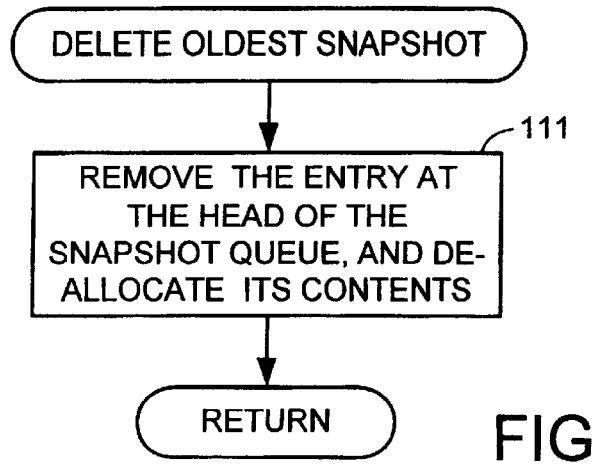
FIG. 12 is a flowchart of a procedure for deleting the oldest snapshot of a production file system when multiple snapshots are organized as shown in FIG. 8.

FIG. 12 shows a procedure for deleting the oldest snapshot in the organization of FIG. 8. In a first step 111, the entry at the head of the snapshot queue is removed, and its contents are de-allocated. Then execution returns.

Figure 13:
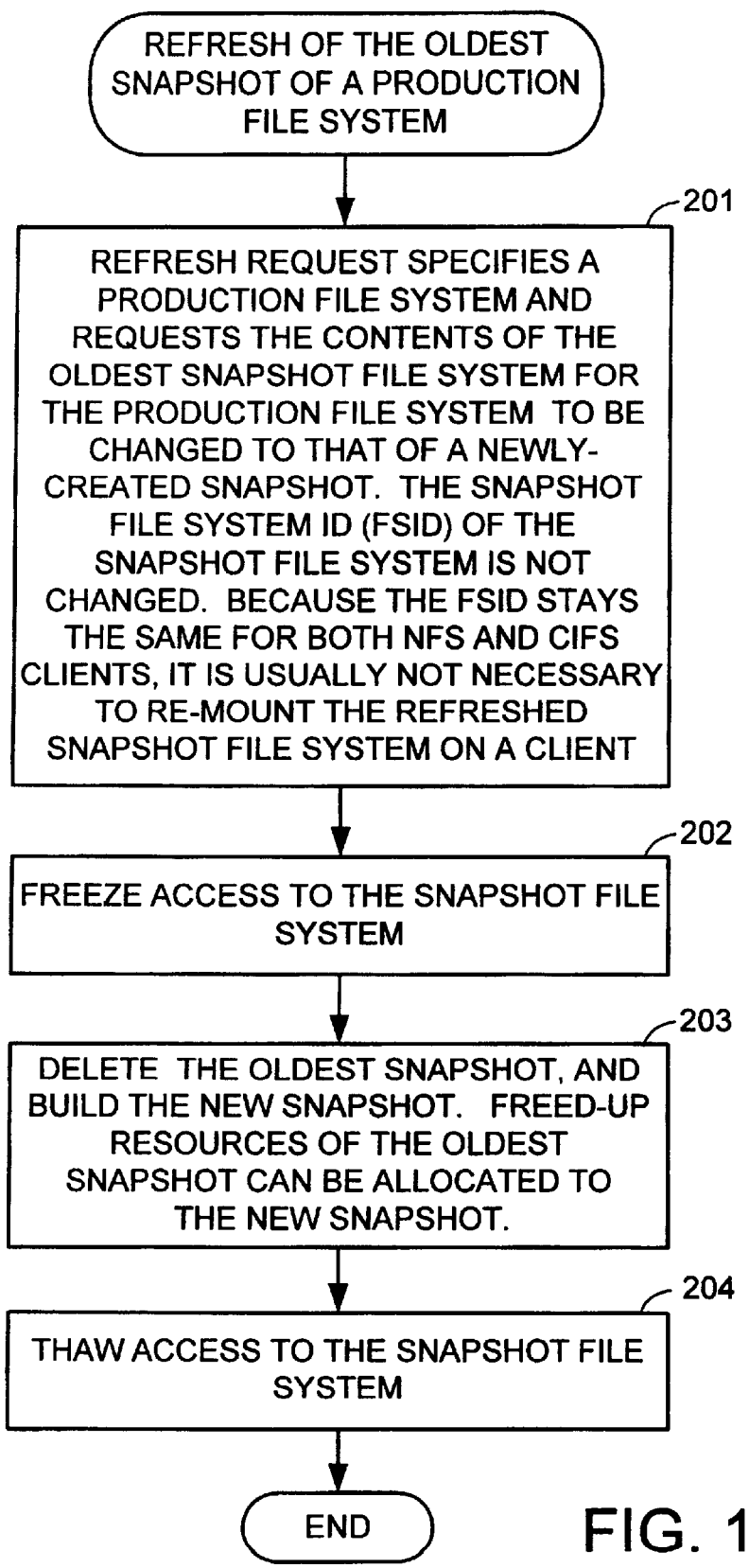
FIG. 13 is a flowchart of procedure for refreshing the oldest snapshot of the production file system.

FIG. 13 shows a procedure for refreshing the oldest snapshot of the production file system with the current state of the production file system. In a first step 201, the network file server receives a refresh request that specifies a production file system and requests the contents of the oldest snapshot file system for the production file system to be changed to that of a newly-created snapshot. The snapshot file system identifier (FSID) of the snapshot file system is not changed. Because the FSID stays the same for both Network File System (NFS) and Common Internet File System (CIFS) clients, it is usually not necessary to re-mount the refreshed snapshot file system on a client. This is very useful, for example, for a system administrator who wants to create a snapshot file system each day during the week, without having to redefine the snapshot file system in mount or export tables on the NFS or CIFS clients.

In step 202, access to the snapshot file system is frozen. Then in step 203, the oldest snapshot is deleted, and the new snapshot is built. Freed-up resources of the oldest snapshot can be allocated to the new snapshot. In step 204, access to the snapshot file system is thawed. This completes the refresh of the oldest snapshot of the production file system.

II. Improvements in the Organization of the Multiple Snapshots

The organization of multiple snapshots as described above with reference to FIGS. 1 to 13 has been improved in a number of ways. The snapshots can be deleted out of order through the use of hidden snapshots. To reduce the memory and storage requirements for maintaining the bit maps and block maps, the bit maps and block maps for all but the most recent snapshot are replaced with hash indices. Moreover, any snapshot can be refreshed with the current state of the production file system.

Figure 14:
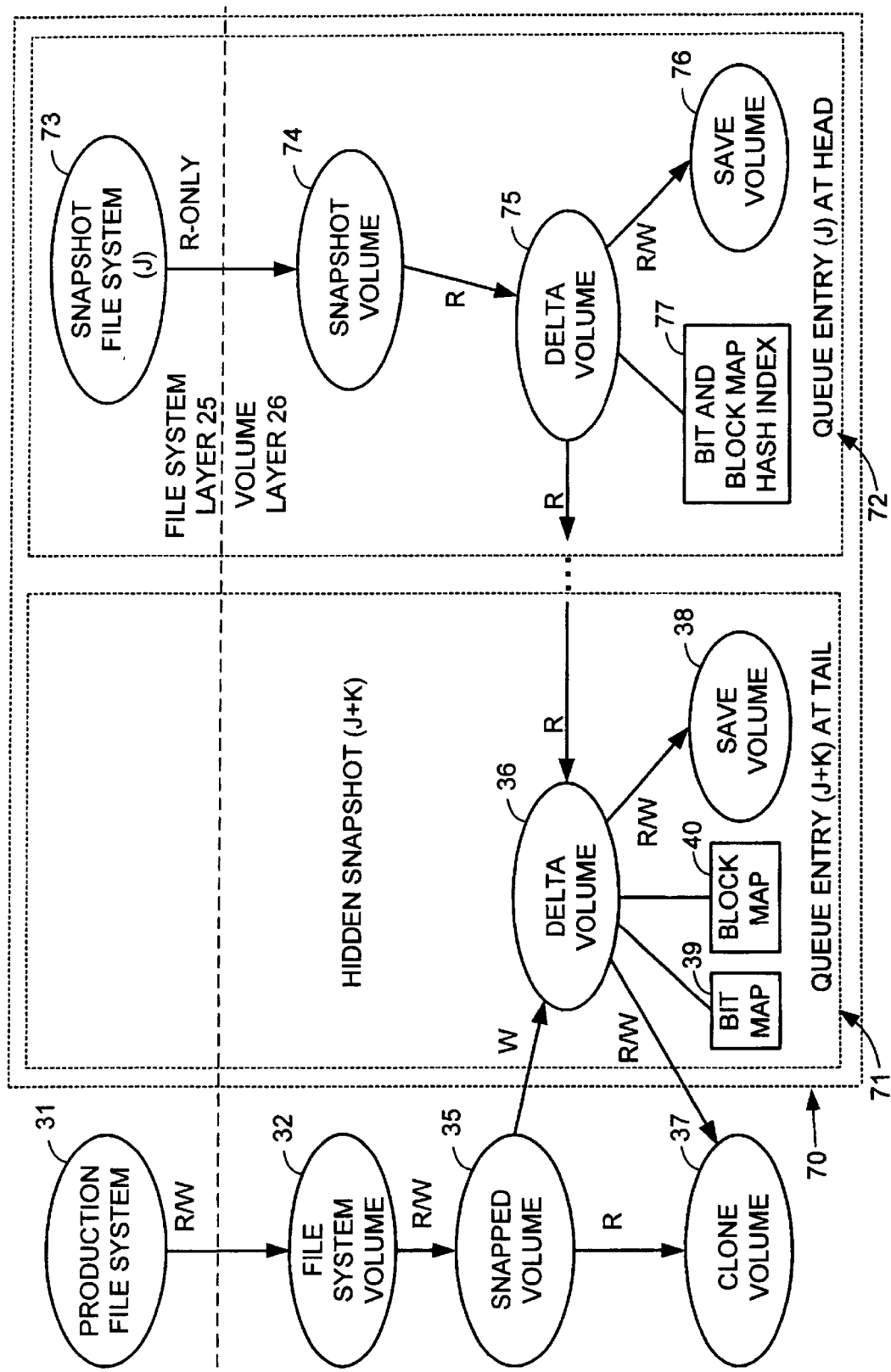
FIG. 14 shows the organization of multiple snapshot versions including a hidden snapshot resulting from deletion of a snapshot that is not the oldest snapshot of the production file system.

FIG. 14 shows a hidden snapshot (J+K) at the entry (J+K) at the tail 71 of the snapshot queue 70. The hidden snapshot (J+K) resulted from the deletion of the corresponding snapshot file system at a time when the snapshot was not the oldest snapshot of the production file system 31. The snapshot file system and the snapshot volume for a hidden snapshot are missing (de-allocated) from the queue entry for the hidden snapshot. FIG. 14 also shows that only the entry (J+K) at the tail 71 of the snapshot queue 70 uses a bit map 39 and block map 40. The other entries in the queue each use a respective combined bit and block map hash index 77, which will be further described below with reference with FIGS. 16 to 19.

Figure 15:
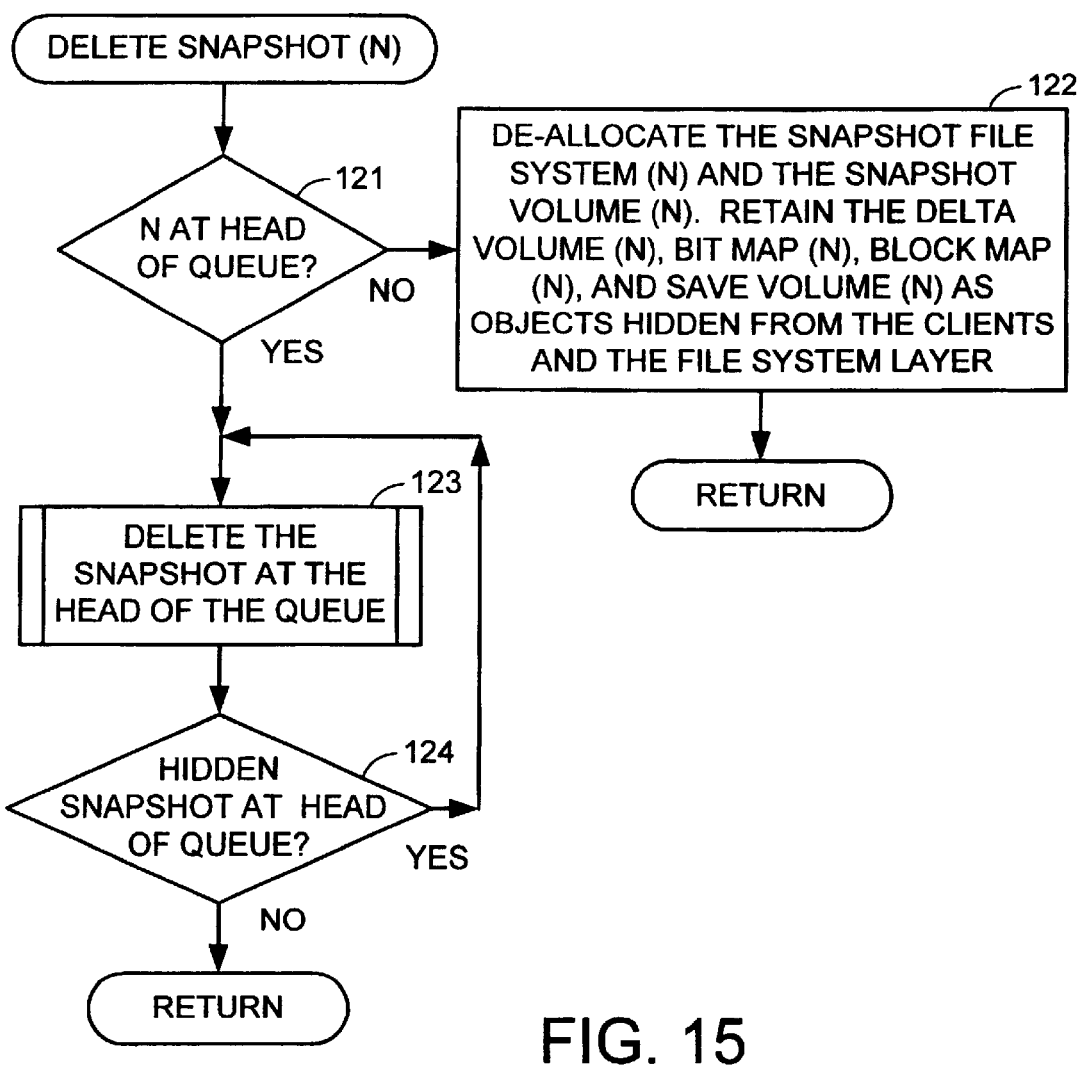
FIG. 15 is a flowchart of a procedure for deleting any specified snapshot of the production file system.

FIG. 15 shows a procedure for deleting any specified snapshot (N). In a first step 121, if the snapshot (N) is not at the head of the snapshot queue, then execution branches to step 122. In step 122, the snapshot file system (N) and the snapshot volume (N) are de-allocated from the entry (N) of the snapshot queue. However, the delta volume (N), bit map (N), block map (N), and save volume (N) are retained in the snapshot queue entry (N) as objects hidden from the clients and the file system layer. After step 122, execution returns.

In step 121, if the snapshot (N) is at the head of the snapshot queue, then execution continues to step 123. In step 123, the snapshot at the head of the queue (i.e., the oldest snapshot) is deleted, for example by calling the routine of FIG. 12. Then in step 124, if the deletion of the snapshot at the head of the queue has caused a hidden snapshot to appear at the head of the queue, execution loops back to step 123 to delete this hidden snapshot. In other words, the deletion of the oldest snapshot file system may generate a cascade delete of a next-oldest hidden snapshot. If in step 124 a hidden snapshot does not appear at the head of the queue, then execution returns.

Figure 16:
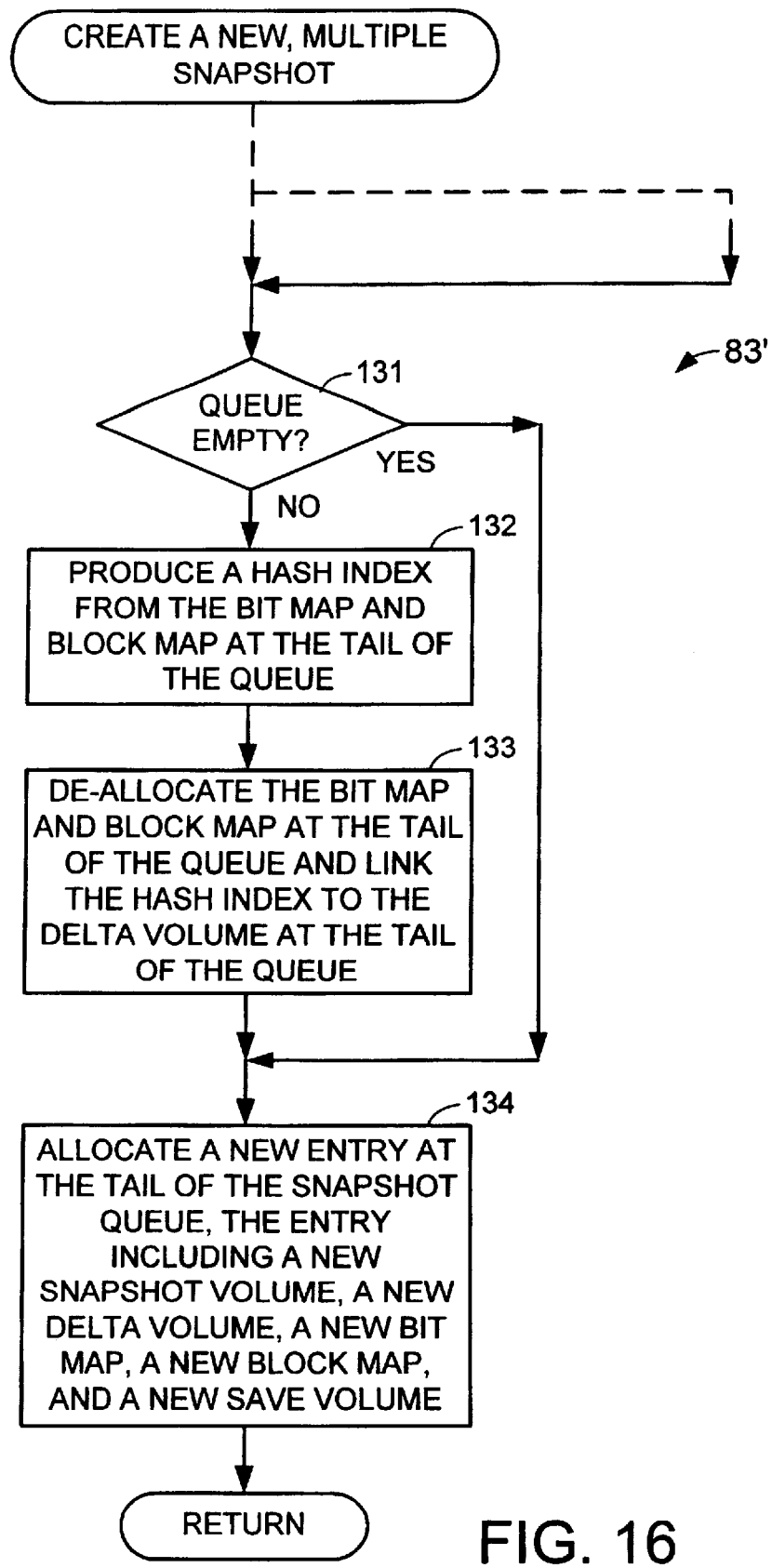
FIG. 16 is a flowchart of a procedure for creating a new multiple snapshot when a bit and block map hash index is used for other then the snapshot at the tail of the snapshot queue in FIG. 13.

FIG. 16 shows a flowchart for creating a new, multiple snapshot in the organization of FIG. 14. The flowchart is similar to the flowchart in FIG. 9 except that the step 83 in FIG. 9 is replaced by a series of steps 131 to 134 collectively designated 83'. In step 131, if the snapshot queue is not empty, then execution continues to step 132. In step 132, a hash index is produced from the bit map and the block map at the tail of the queue. The production of the hash index will be described further below with reference to FIG. 18. Then in step 133, the bit map and the block map at the tail of the snapshot queue are de-allocated, and the hash index is linked to the delta volume at the tail of the snapshot queue. After step 133, execution continues to step 134. Execution also branches to step 134 from step 133 if the queue is empty. In step 134, a new queue entry is allocated at the tail of the snapshot queue. The new entry includes a new snapshot volume, a new delta volume, a new bit map, a new block map, and a new save volume. After step 134, execution returns.

Figure 17:
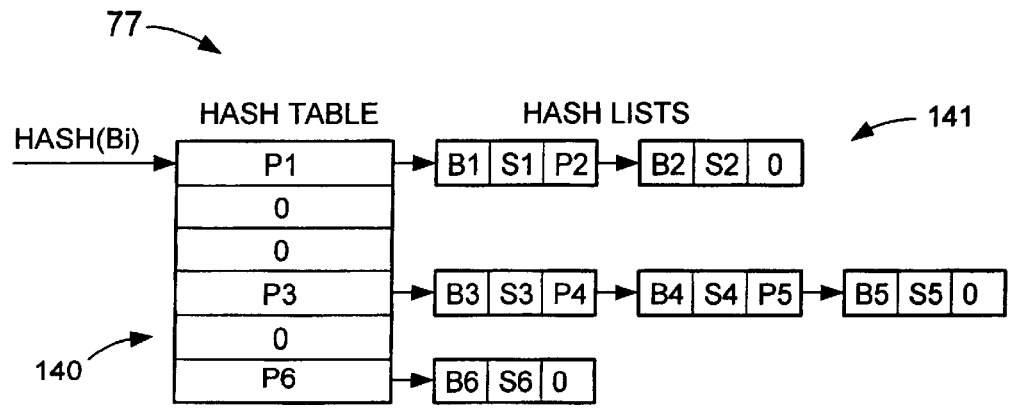
FIG. 17 is a block diagram of the bit and block map hash index introduced in FIG. 13.

FIG. 17 shows an example of internal organization for the bit and block map hash index (77 in FIG. 13). FIG. 17 shows that the hash index 77 includes a hash table 140 and number of hash lists 141. Each non-zero entry in the hash table 140 points to a respective one of the hash lists 141. Each entry in each hash list includes a block address (Bi) to a block in the clone volume, a corresponding block address (Si) of the block in the save volume, and a value that is either zero indicating the end of the has list, or a pointer to the next entry in the list.

Figure 18:
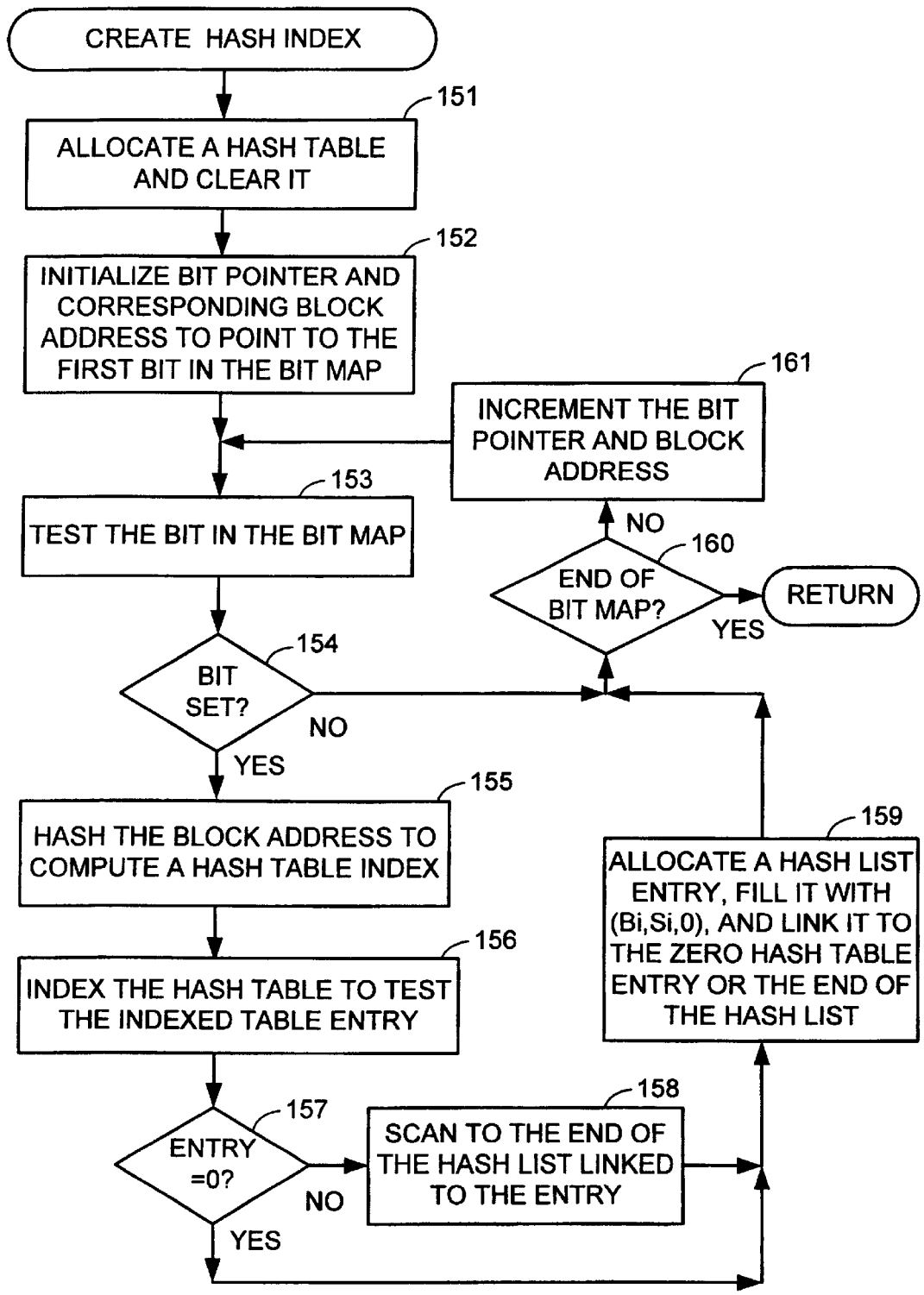
FIG. 18 is a flowchart of a procedure for creating the bit and block map hash index of FIG. 16.

FIG. 18 shows a procedure for creating the hash index of FIG. 17. In a first step 151 of FIG. 18, a hash table is allocated and cleared. Then in step 152, a bit pointer and a corresponding block address are initialized to point to the first bit in the bit map and the first block in the clone volume. Then in step 153, the pointed-to bit in the bit map is tested.

In step 154, execution continues to step 155 if the tested bit is found to be set. In step 155, the block address is hashed to compute a hash table index. For example, the hash table has 1 M entries, and the hashing function produces a number between zero and 1 M minus 1 by masking out the least significant 20 bits of the block address. Then in step 156, the hash table is indexed to test the table entry. In step 157, if the table entry is not zero, then in step 158 the hash list linked to the table entry is scanned to find the end of the hash list. After step 158, execution continues to step 159. Execution also continues to step 159 from step 157 when the entry is zero.

In step 159, a hash list entry is allocated, filled with the current block address (Bi), the corresponding save volume address (Si), and zero, and the entry is linked to the zero hash table entry or to the end of the hash list. Execution continues from step 159 to step 160. Execution also branches to step 160 from step 154 if the tested bit in the bit map is not set. In step 160, if the end of the bit map has been reached, then the entire hash index has been produced, and execution returns. Otherwise, execution continues from step 160 to step 161. In step 161, the bit pointer and the corresponding block address are incremented, and execution loops back to step 153.

Figure 19:
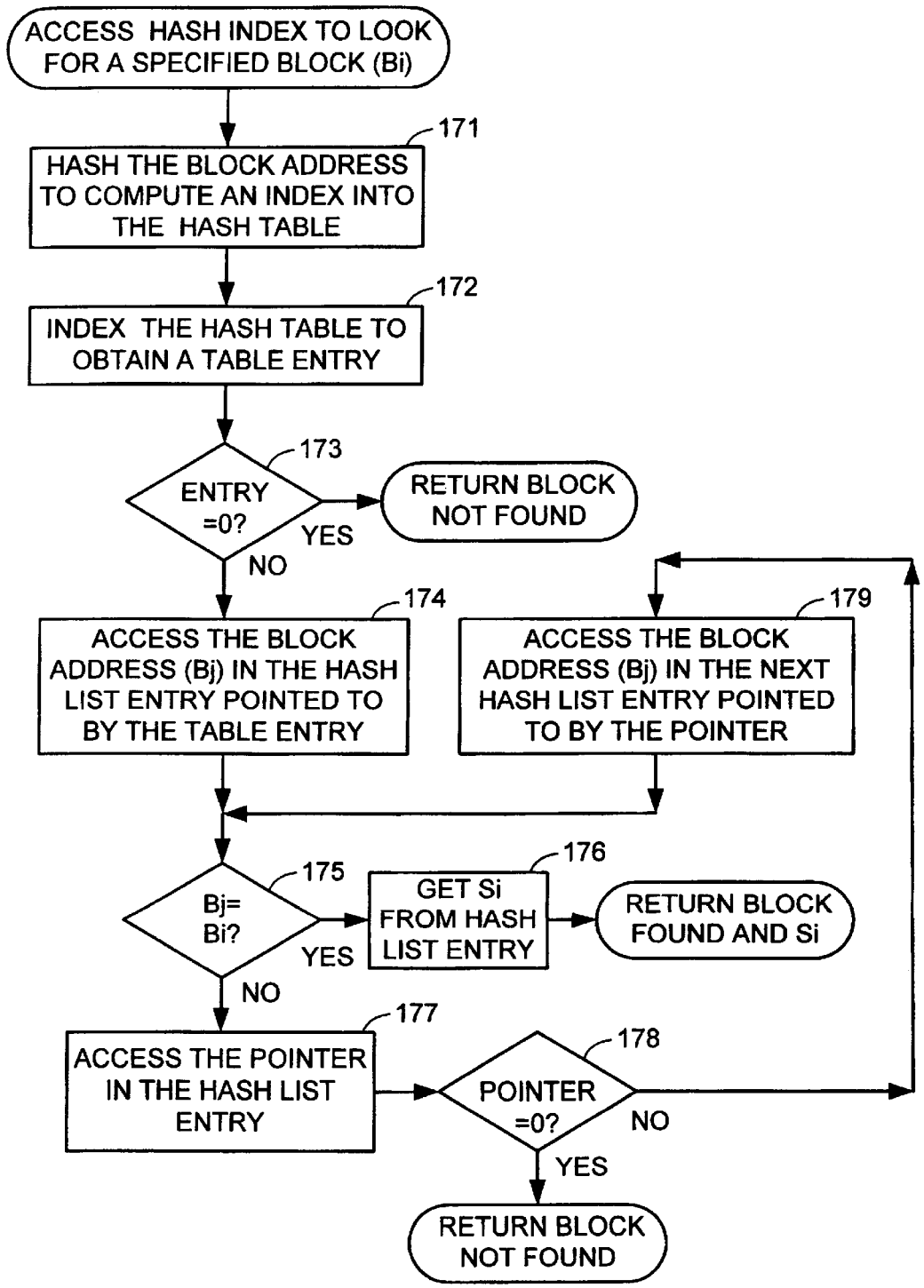
FIG. 19 is a flowchart of a procedure for accessing the bit and block map hash index.

FIG. 19 shows a procedure for accessing the combined bit and block map hash index. In a first step 171, the block address is hashed to compute an index into the hash table. In step 172, the hash table is indexed to obtain a table entry. In step 173, if the entry is equal to zero, then execution returns signaling that the specified block has not been found. Otherwise, if the entry is not equal to zero, then execution continues to step 174. In step 174, the block address (Bj) in the hash list entry pointed to by the table entry is accessed. In step 175, the block address (Bj) is compared to the specified block address (Bi). If Bj is equal to Bi, then execution continues to step 176, to get the corresponding save volume block address (Si) found in the hash list entry pointed to by the table entry. Execution then returns indicating that the specified block (Bi) has been found, and also returning the corresponding save volume block address (Si). In step 175, if Bj is not equal to Bi, then execution continues to step 177. In step 177, the pointer in the hash list entry is accessed. Then in step 178, if the pointer is equal to zero (i.e., the end of the hash list has been reached), then execution returns indicating that the specified block is not found in the hash index. Otherwise, if the pointer is not equal to zero, then execution continues to step 179, in order to access the block address (Bj) in the next hash list entry pointed to by the pointer. After step 179, execution loops back to step 175.

Figure 20:
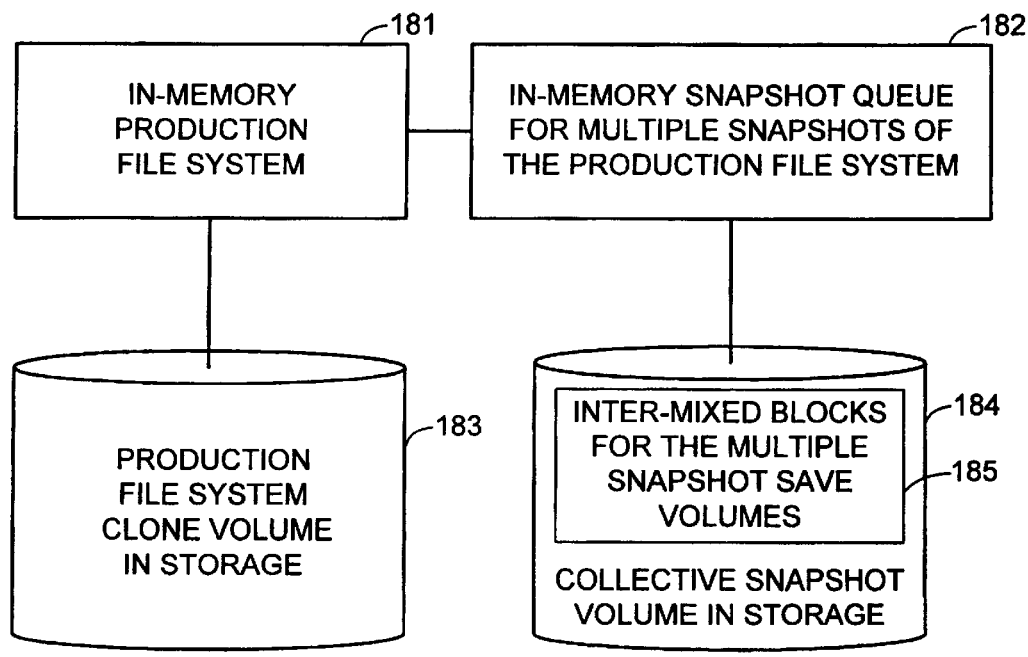
FIG. 20 shows the intermixing of blocks for multiple snapshot save volumes in a collective snapshot volume in storage.

FIG. 20 shows a partitioning of objects of FIG. 14 between memory and storage. The memory includes memory 181 for the production file system, which stores the production file system, the file system volume, and the snapped volume. The memory also includes memory 182 for storing the snapshot queue for multiple snapshot versions of the production file system. The storage includes storage 183 for storing the production file system clone volume. There is also storage 184 for a collective snapshot volume. This collective snapshot volume includes inter-mixed blocks 185 for the multiple snapshot save volumes.

Because the production file system and the snapshot queue have in-memory components 181 and 182 as shown in FIG. 20, these in-memory components are recovered on a reboot from their respective storage components 183 and 184. The in-memory snapshot queue 182 is recovered before the primary file system is made available for read/write access. For example, the in-memory snapshot queue 182 is recovered before the in-memory production file system 181 is recovered. This allows any and all modifications made to the production file system during recovery to be captured and saved by the snapshot copy process.

Figure 21:
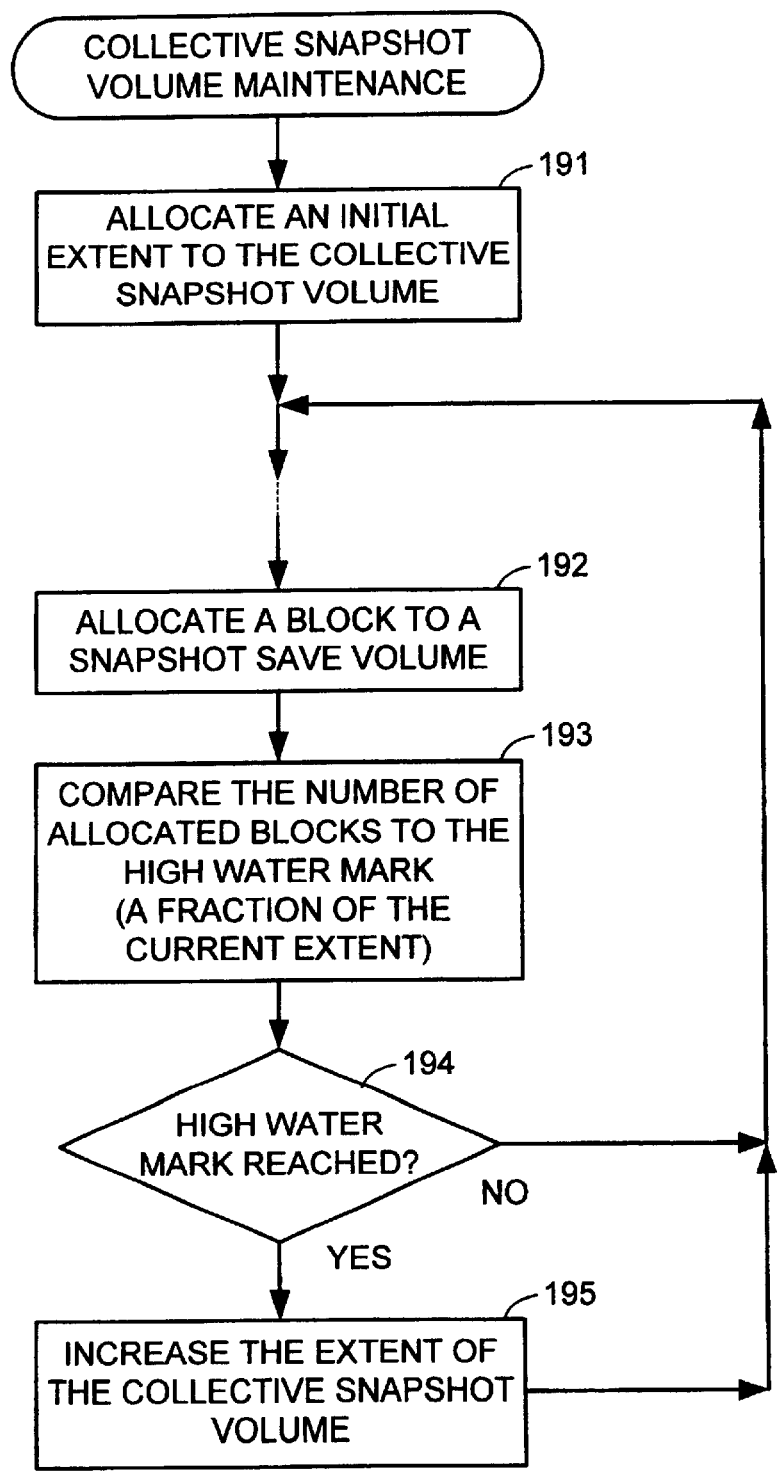
FIG. 21 is a flowchart of a procedure for maintaining the collective snapshot volume introduced in FIG. 19.

FIG. 21 shows a procedure for maintenance of the collective snapshot volume (184 in FIG. 19). In a first step 191, an initial extent is allocated to the collective snapshot volume. For example, the initial extent is 10 percent of the size of the production file system size. There is also a certain granularity of allocated storage space, such as chunks of 128 megabytes, and a minimum allocation of eight chunks. The system administrator can also configure the source pool of disk drives for the collective snapshot volume for better performance. Eventually, due to write access to the production volume after a snapshot has been created, in step 192, a block is allocated to a snapshot version. After this occurs, in step 193, the number of allocated blocks is compared to a high water mark, which is computed, for example, as a user-specified fraction of the current extent, or a default of ninety percent of the current extent. In step 194, if the high water mark is not reached, then execution loops back and the routine is dormant until another block is allocated to a snapshot save volume in step 192. In step 194, if the high water mark has been reached, then execution continues to step 195 to increase the extent of the collective snapshot volume. A so-called hyper volume has such a capability of being dynamically extended to use the next available disk drive in the file server. Unless a storage limit has been reached, the extent is increased by the greater of eight chunks or ten percent of the size of the production file system. If the file system cannot be extended at this point due to storage limitations, then the oldest snapshot file system can be inactivated (internally unmounted) or deleted to release and re-use its storage. After step 195, execution loops back and the routine is dormant until another block is allocated to a snapshot version in step 192.

Figure 22:
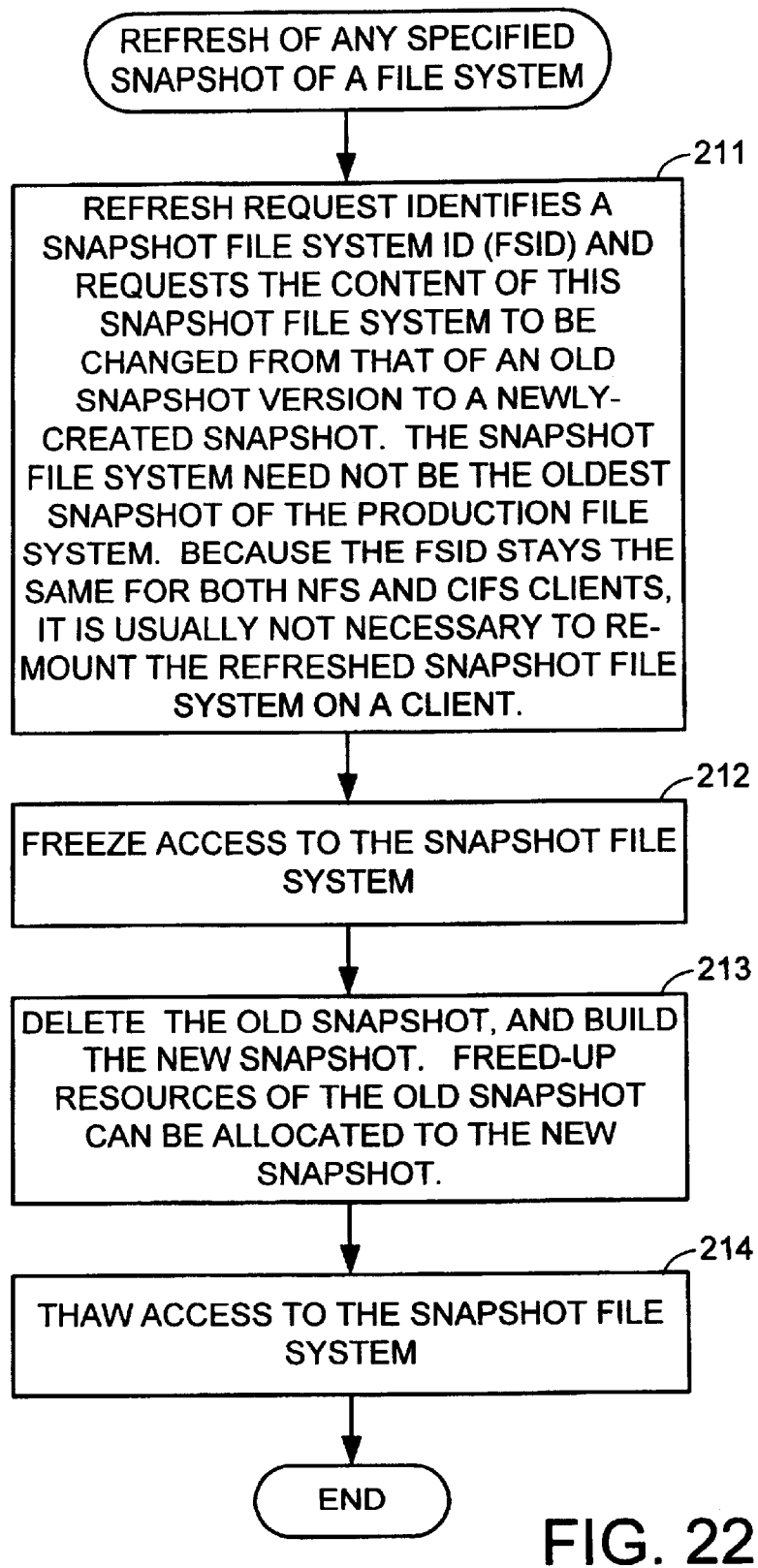
FIG. 22 is a flowchart of a procedure for refreshing a specified snapshot of the production file system.

FIG. 22 is a flowchart of a procedure for refreshing any specified snapshot of a file system. In a first step 211, the network file server receives a refresh request that identifies a snapshot file system identifier (FSID) and requests the contents of this specified snapshot file system to be changed from that of an old snapshot to a newly-created snapshot. The specified snapshot file system need not be the oldest snapshot of the production file system. Because the FSID stays the same for both NFS and CIFS clients, it is usually not necessary to re-mount the refreshed snapshot file system on a client. In step 212, access to the specified snapshot file system is frozen. Then in step 213, the old snapshot is deleted, and the new snapshot is built. Freed-up resources of the old snapshot can be allocated to the new snapshot. Then in step 214, access to the snapshot file system is thawed. This completes the refresh of the specified snapshot of the file system.

III. Instantaneous Restoration of the Production File System

Figure 23:
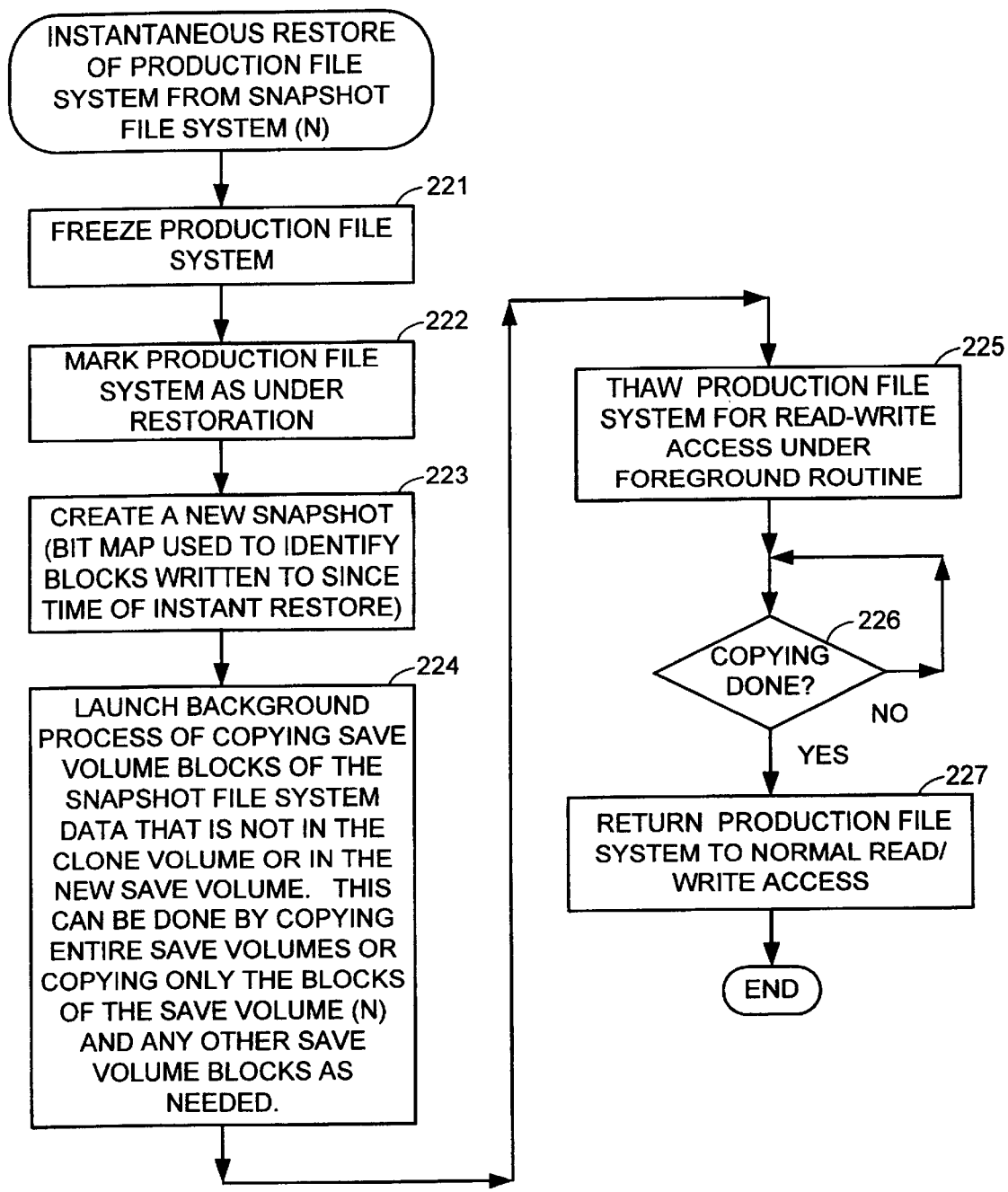
FIG. 23 is a procedure for instantaneous restoration of the production file system from a specified snapshot of the production file system.

FIG. 23 shows a procedure for instantaneous restoration of the production file system from a specified one of its snapshots. In a first step 221, access to the production file system is frozen. Current operations upon the file system are completed but servicing of any subsequent access request is temporarily suspended until access to the production file system is thawed. In step 222, the production file system is marked as being under restoration. This causes read/write access to the production file system to be modified so that it is performed in accordance with a foreground routine as further described below with reference to FIG. 27. In the next step 223 of FIG. 23, a new snapshot is created.

The bit map for the new snapshot is used to identify blocks written to since the time of the instantaneous restoration. Moreover, the new snapshot is used to ensure that the restore is persistent on reboot or remount.

In step 224, a background process is launched for copying save volume blocks of the snapshot file system data that is not in the clone volume or in the new save volume.

This can be done in an unwinding process by copying all the blocks of a series of the save volumes in the snapshot queue beginning with the most recent save volume (J+K−1) before the save volume (J+K) of the new snapshot created in step 223 and continuing with the next most recent save volumes up to and including the save volume (N), as further described below with reference to FIG. 24. Alternatively, this can be done by copying only the blocks of the save volume (N) and any other save volume blocks as needed, as further described below with reference to FIG. 25. In step 225 the production file system is thawed for read/write access under the foreground routine shown in FIG. 27 and further described below. In step 226, execution is stalled until the copying of step 224 is done. Once the copying is done, execution continues to step 227. In step 227, the production file system is returned to normal read/write access. This completes the top-level procedure for the instantaneous restoration process.

Figure 24:
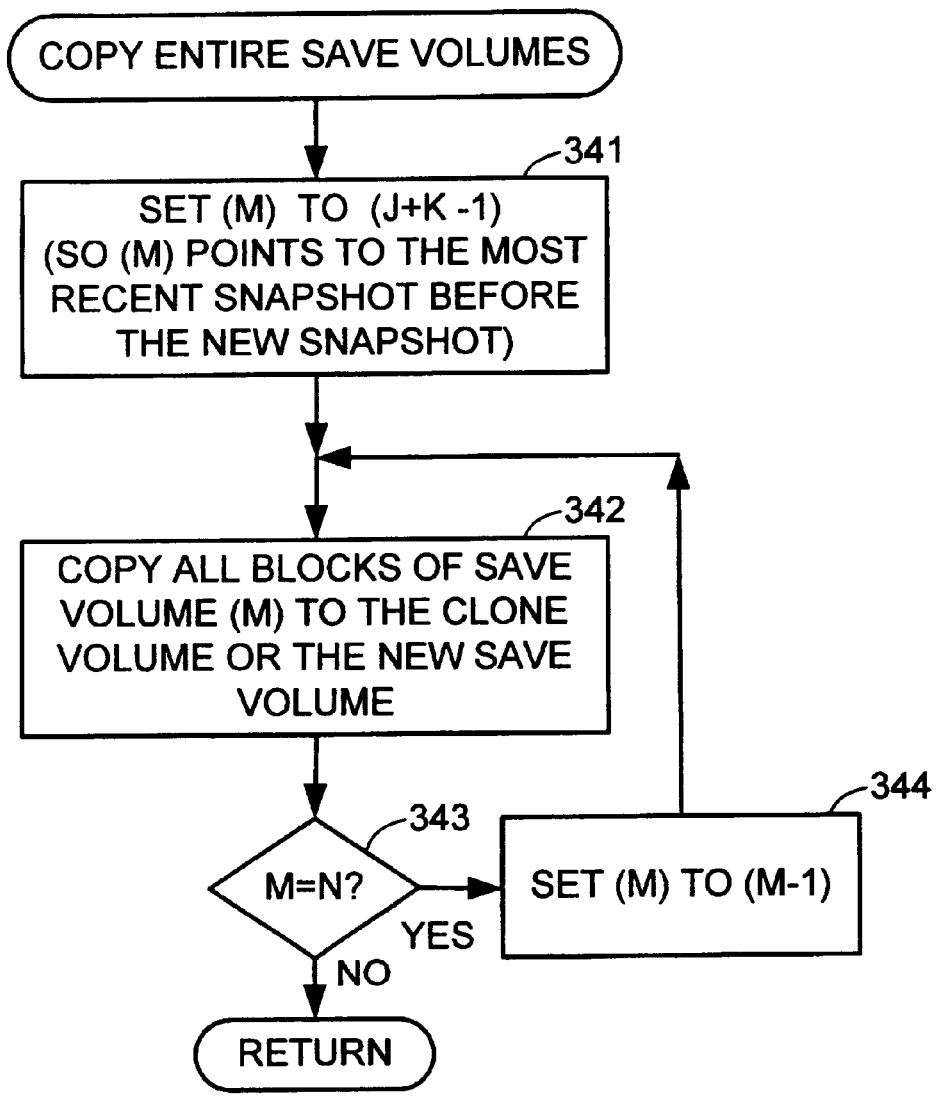
FIG. 24 is a flowchart of a background routine for restoration by copying from save volumes to the clone volume in an unwinding process.

FIG. 24 shows the background routine for copying entire save volumes to the clone volume or the new save volume (J+K) in an unwinding process. In a first step 341 a snapshot pointer (M) is set to (J+K−1) so that the pointer (M) points to the most recent snapshot before the new snapshot (created in step 223 of FIG. 23). Then in step 342, all blocks of the save volume (M) are copied to the clone volume or the new save volume (J+K), as further described below with reference to FIG. 26. Then in step 343, the routine is finished if the pointer (M) points to the snapshot (N) from which the production file system is being restored. Otherwise, execution branches from step 343 to step 344. In step 344, the pointer (M) is decremented by one. Execution loops back from step 344 to step 342.

The unwinding process of FIG. 24 has the disadvantage of possibly copying more than one save volume block corresponding to a single clone volume block. If this occurs, only the last copy operation (from the oldest save volume not older than the save volume N) is needed. The impact of this disadvantage can be minimized by using an efficient method of block copying, such as moving logical-to-physical mapping pointers to the physical storage locations of the data of the blocks. Otherwise, the unnecessary copy operations can be avoided by using an alternative background copy routine shown in FIG. 25.

Figure 25:
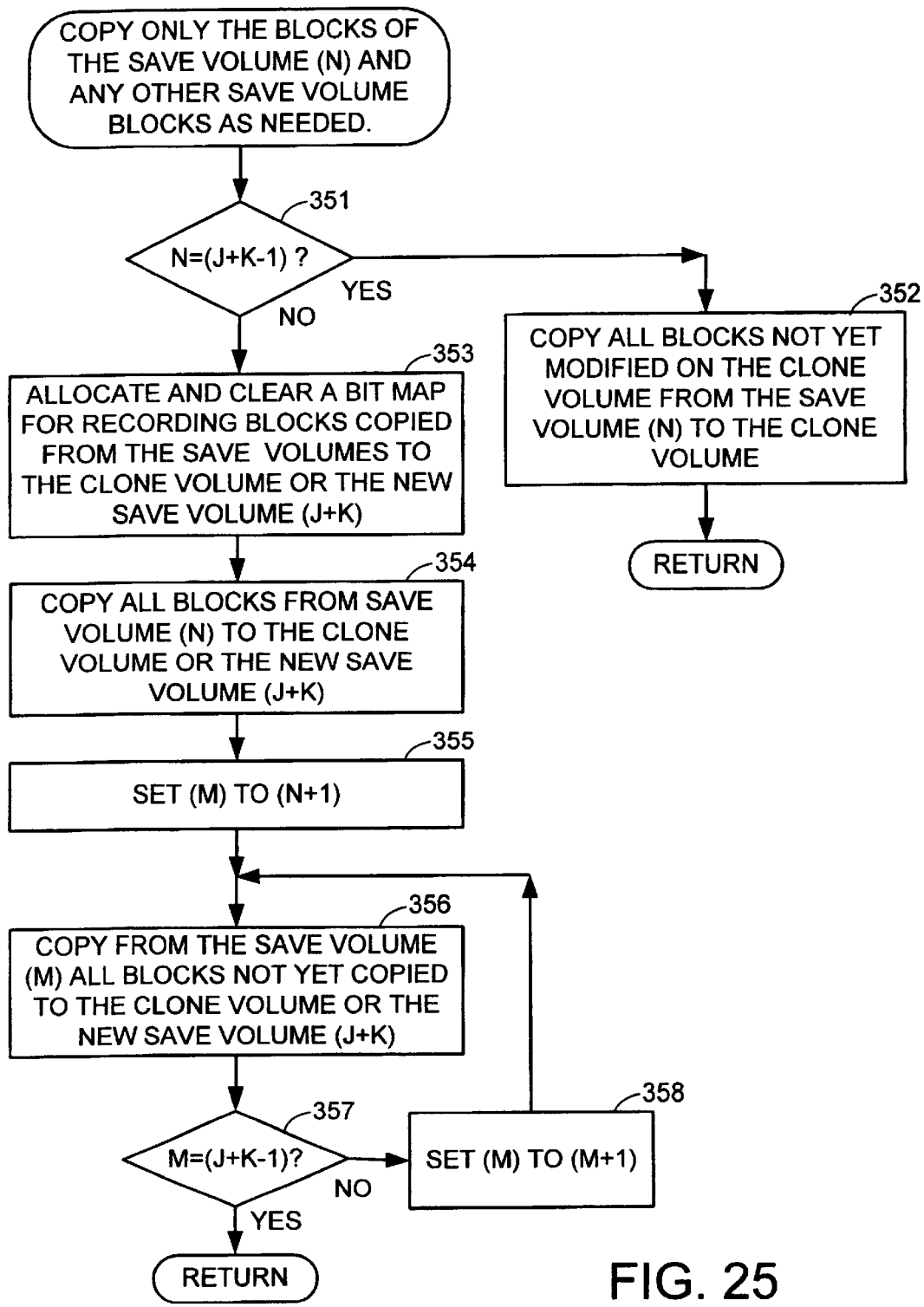
FIG. 25 is a flowchart of a background routing for restoration by copying only the blocks as needed from save volumes to the clone volume.

In a first step 351 of FIG. 25, if the snapshot file system (N) is the most recent snapshot before the new snapshot (created in step 223 of FIG. 23) (i.e., N=(J+K−1)), then execution branches from step 351 to step 352. In step 352, all blocks not yet modified on the clone volume are copied from the save volume (N) to the clone volume, for example using the routine described further below with reference to FIG. 26. Execution returns after step 252.

If in step 351 (N) is not equal to (J+K−1), then execution continues to step 353. In step 353, a bit map is allocated and cleared for recording that blocks have been copied from the save volumes to the clone volume or the new save volume (J+K). In step 354, all blocks are copied from the save volume (N) to the clone volume or the new save volume (J+K), and corresponding bits in the bit map (allocated and cleared in step 353) are set to indicate the blocks that have been copied. In step 355, s snapshot pointer (M) is set to (N+1). In step 356, all blocks in the save volume (M) not yet copied to the clone volume or the new save volume (J+K) are copied from the save volume (M) to the clone volume or the new save volume (J+K). Step 356 may use a routine similar to the routine described below with reference to FIG. 26, except that the bit map (allocated and cleared in step 351) is tested before a block is copied in order to skip the copying of the block if the corresponding bit in the bit map is set, and after any block is copied, the corresponding bit in the bit map is set to indicate that the block has been copied. In step 357, execution returns if (M) is equal to (J+K−1). Otherwise, execution branches to step 358. In step 358, the pointer (M) is incremented by one, and then execution loops back to step 356.

Figure 26:
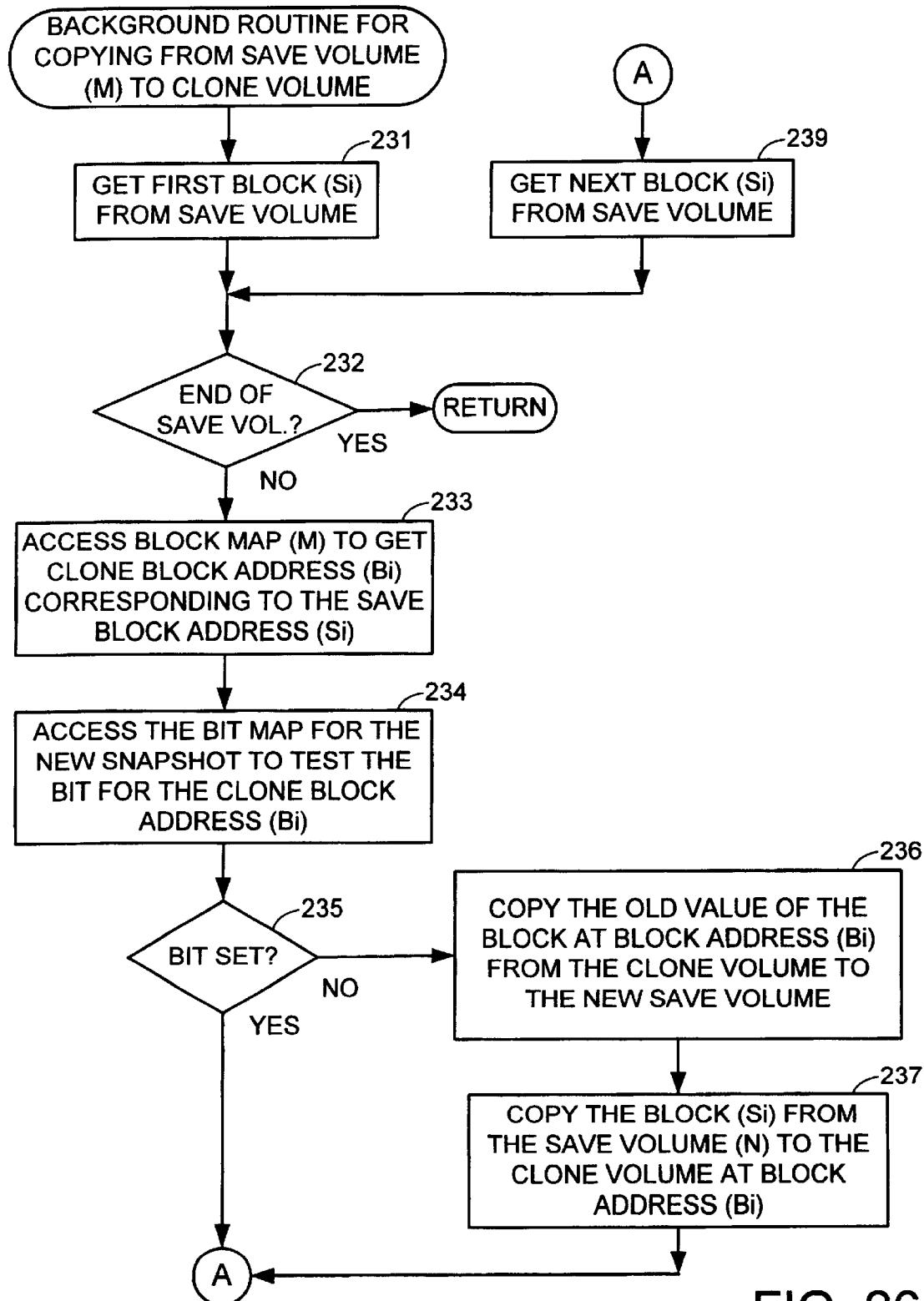
FIG. 26 is a flowchart of a background routine for copying blocks from a specified save volume to the clone volume.

FIG. 26 shows the background routine for copying from the save volume for the snapshot (N) to the clone volume. In a first step 231, a first block (Si) is obtained from the save volume. The blocks can be obtained from the save volume and copied to the clone volume in any order, so it is convenient to copy the save volume blocks in the order in which the save volume block addresses (Si) are found during a scan of the block map for the snapshot (N). Then in step 232, if the end of the save volume has been reached, then the copying process has been completed and execution returns. Otherwise, execution continues from step 232 to step 233. In step 233, the block map for the snapshot (N) is accessed to get the clone block address (Bi) corresponding to the save block address (Si). Then in step 234, the bit map is accessed for the new snapshot to test the bit for the clone block address (Bi). In step 235, if the tested bit is set, then execution continues from step 237 to step 239 to get the next block (Si) from the save volume. Execution loops back from step 239 to step 232.

If in step 235 the tested bit was not set, then execution continues to step 236. In step 236, the old value of the block at block address (Bi) is copied from the clone volume to the new save volume. Then in step 237, the block (Si) is copied from the save volume (N) to the clone volume at the block address (Bi). From step 237, execution continues to step 239. The copying process continues until the end of the save volume is reached in step 232.

Figure 27:
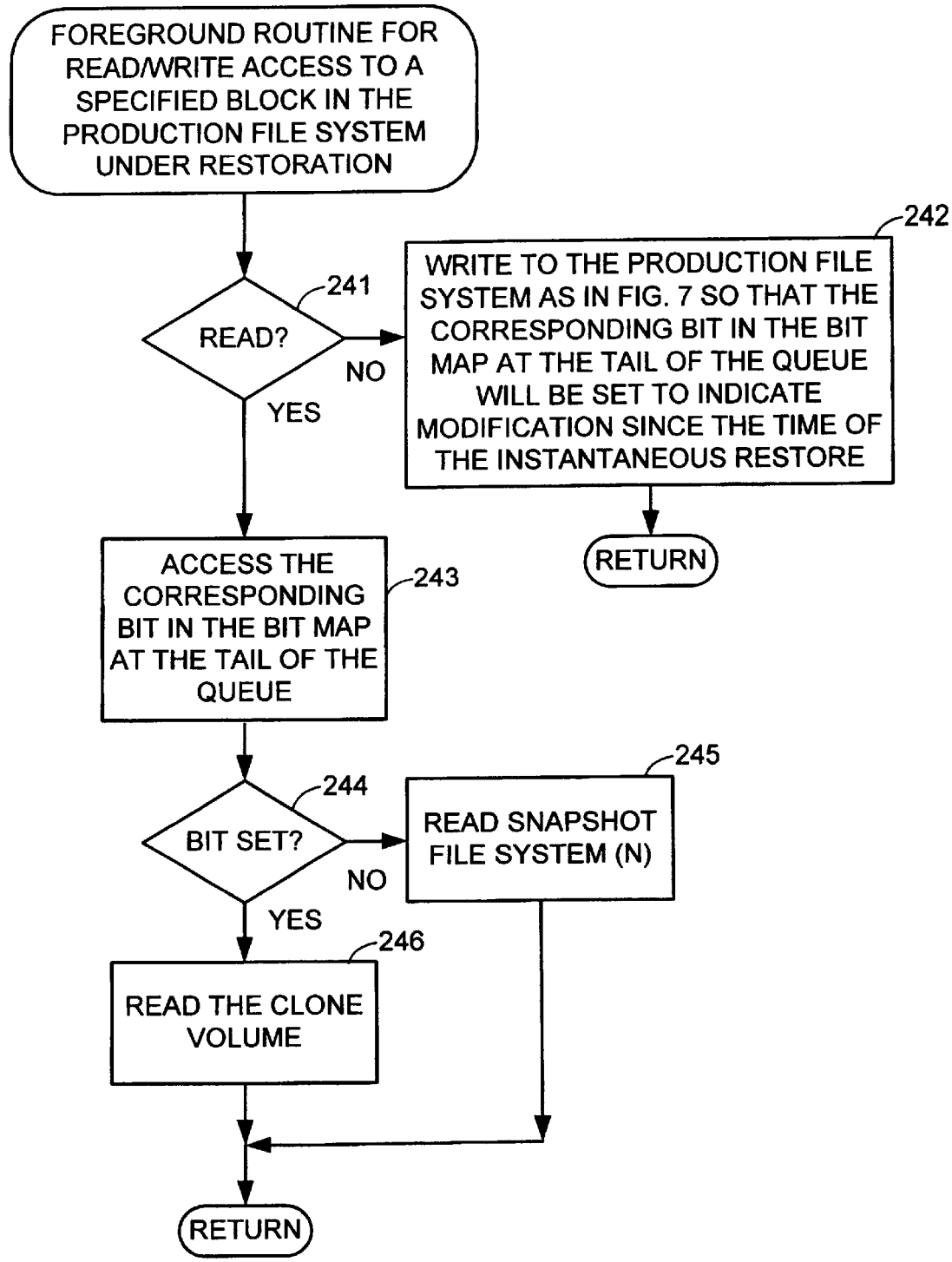
FIG. 27 is a flowchart of a foreground routine for read/write access to a specified data block in the production file system under restoration.

FIG. 27 is a flowchart of a foreground routine for read/write access to a specified block in the production file system under restoration. In a first step 241, execution branches to step 242 for write access to the production file system under restoration. In step 242, the production file system is written to as in FIG. 7 so that the corresponding bit in the bit map at the tail of the snapshot queue will be set to indicate that the corresponding block has been modified since the time of the instantaneous restore operation. After step 242, execution returns.

In step 241, for a read access to the production file system under restoration, execution continues to step 243. In step 243, the corresponding bit is accessed in the bit map at the tail of the snapshot queue. Then in step 244, if the bit is not set, then execution branches to step 245 to read the snapshot file system (N) from which the production file system is being restored. After step 245, execution returns. If in step 244 the bit is set, then execution continues to step 246 to read the clone volume, and then execution returns.

IV. Meta Bit Maps for Indicating Invalid Data Blocks

In the above description of the snapshot copy process, and in particular FIG. 7, it was assumed that the original contents of a block of the production file system must be saved to the most recent save volume before the contents of the block are modified by a write access to the production file system. In practice, however, the original contents are often invalid, and therefore need not be saved. For example, many applications start with an empty dataset or file, and the dataset or file increases in size as data is written to the file. In some of these applications, the dataset or file rarely decreases in size. However, storage for the file may be released when the dataset or file is deleted from the file server, for example, when the file is transferred to archival storage. In some applications, the extent of a dataset or file may be dynamically decreased concurrent with read/write access to the dataset or file.

It has been discovered that there are significant advantages to identifying when read/write access to the production file system is about to modify the contents of an invalid data block. If this can be done in an efficient manner, then there can be a decrease in the access time for write access to the production file system. A write operation to an invalid block can be executed immediately, without the delay of saving the original contents of the data block to the most recent save volume at the tail of the snapshot queue. Moreover, there is a saving of storage because less storage is used for the save volumes. There is also a decrease in memory requirements and an increase in performance for the operations upon the snapshot file systems, because the bit and block hash indices are smaller, and the reduced amount of storage for the snapshots can be more rapidly restored to the production file system, or deallocated for re-use when snapshots are deleted.

An efficient way of identifying when read/write access to the production file system is about to modify the contents of an invalid data block is to use a meta bit map having a bit for indicating whether or not each allocated block of storage in the production file system is valid or not. For example, whenever storage is allocated to the production file system by the initial allocation or the extension of a clone volume, a corresponding meta bit map is allocated or extended, and the bits in the meta bit map corresponding to the newly allocated storage are initially reset.

Figure 28:
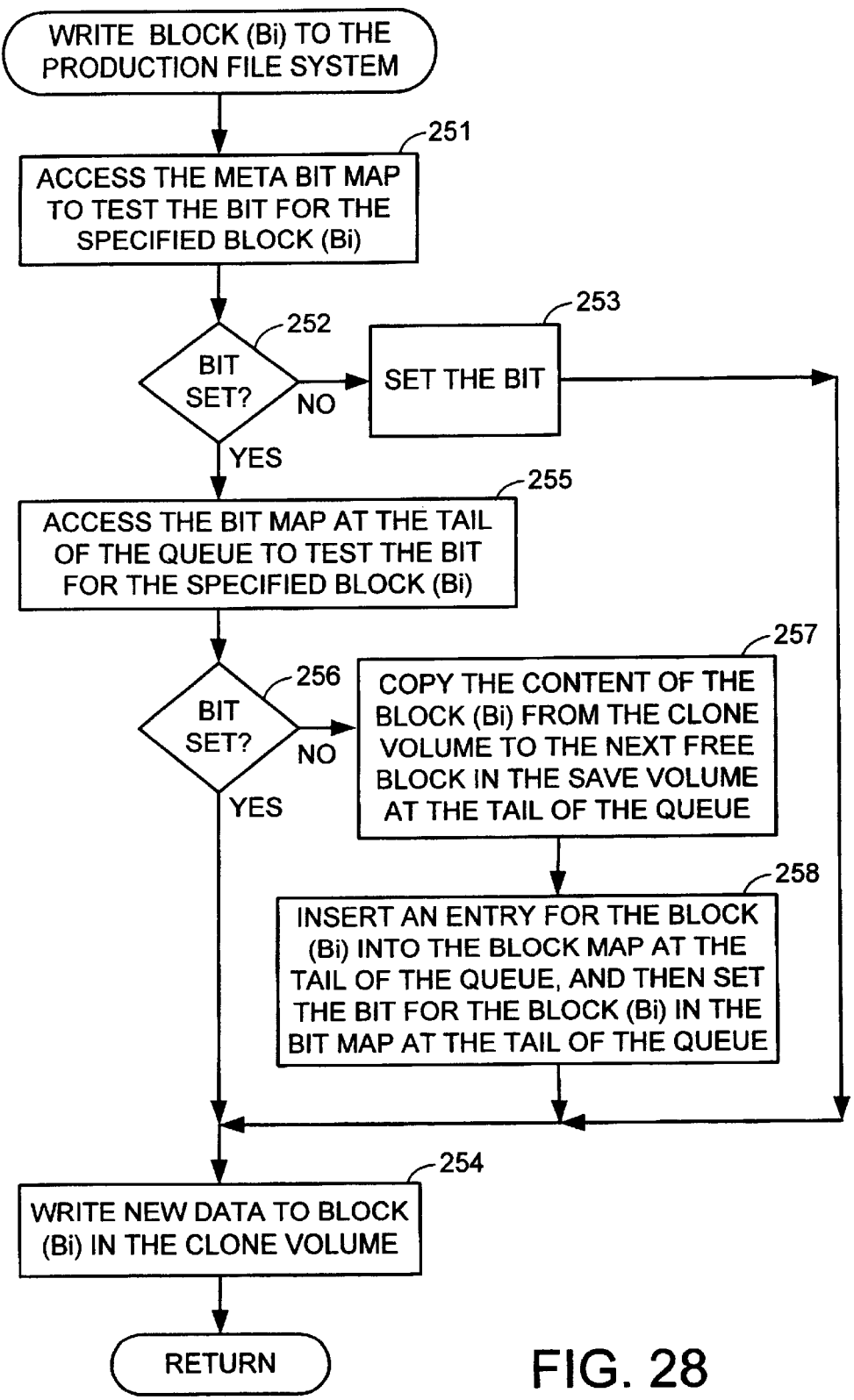
FIG. 28 is a flowchart for writing a specified data block to the production file system.

FIG. 28 shows a procedure for writing a specified block (Bi) to the production file system when there is a meta bit map for indicating invalid data blocks in the production file system. In a first step 251, the meta bit map is accessed to test the bit for the specified block (Bi). Next, in step 252, if the tested bit is found to be not set, execution branches to step 253. In step 253, the tested bit is set. Then in step 254, the new data is written to the block (Bi) in the clone volume, and execution returns.

In step 252, if the tested bit in the meta bit map is set, then execution continues to step 255 to access the bit map for the snapshot at the tail of the snapshot queue to test the bit for the specified block (Bi). Then in step 256, execution branches to step 257 if the tested bit is not set. In step 257, the content of the block (Bi) is copied from the clone volume to the next free block in the save volume at the tail of the snapshot queue. In step 258, an entry for the block (Bi) is inserted into the block map at the tail of the snapshot queue, and then the bit for the block (Bi) is set in the bit map at the tail of the snapshot queue. Execution continues from step 258 to step 254 to write new data to the specified block (Bi) in the clone volume, and then execution returns. Execution also continues from step 256 to step 254 when the tested bit is found to be set.

Figure 29:
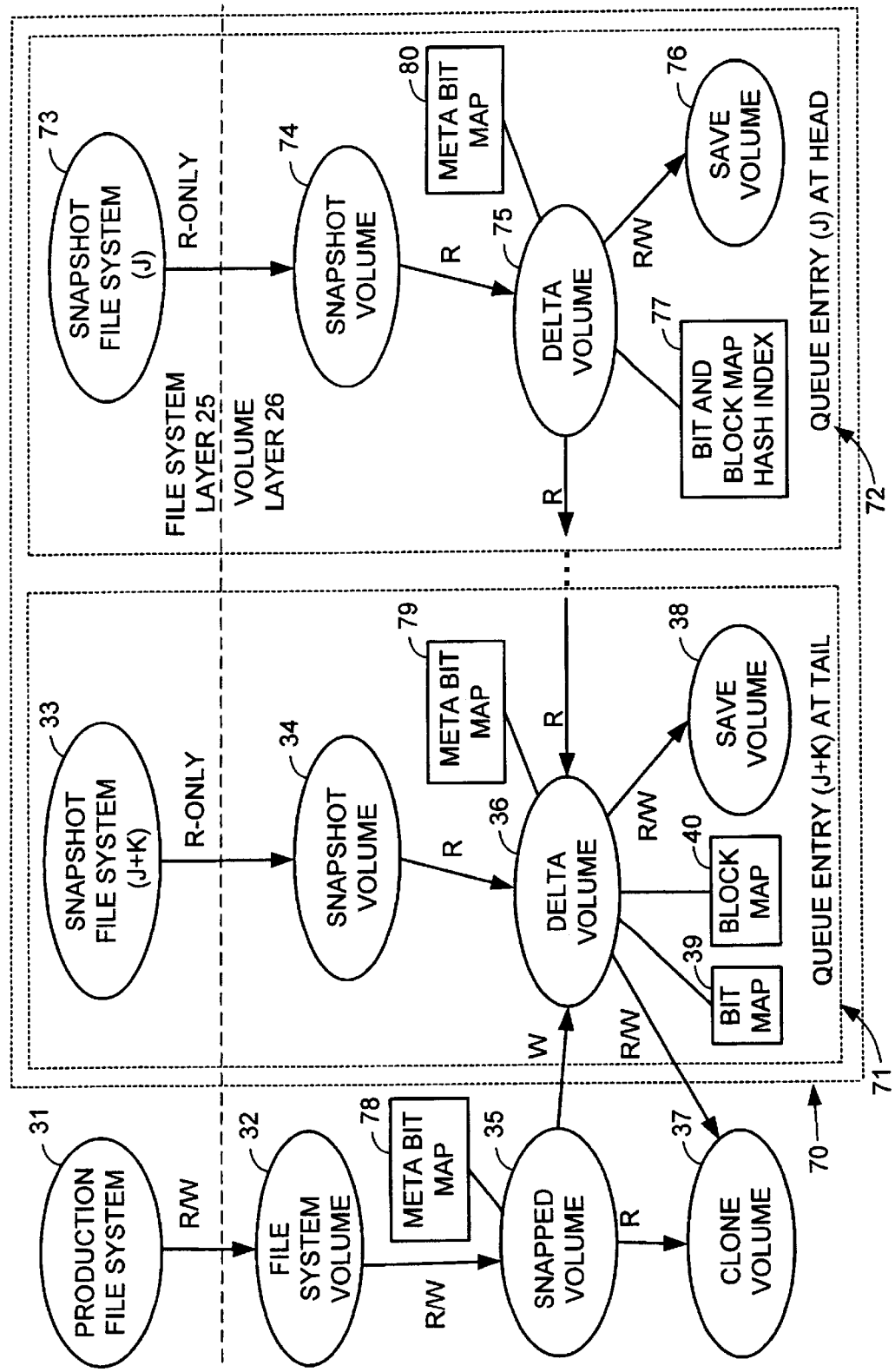
FIG. 29 is a diagram of the organization of multiple snapshots when a meta bit map is used to reduce the burden of copying and saving old data from invalid blocks in the production file system when new data is written to the blocks in the production file system.

FIG. 29 shows organization of the snapshots in the network file server when a respective meta bit map 79, and 80 is maintained for each snapshot in addition to the meta bit map 78 for the production volume. It is desired to maintain a respective meta bit map for each snapshot so that whenever the production file system is restored with a snapshot file system, the meta bit map for the production file system can be restored with the meta bit map for each snapshot. For example, when a new snapshot is created and put in a new queue entry at the tail of the snapshot queue, a snapshot copy of the meta bit map (i.e., the meta bit map for the new snapshot) is put in the new queue entry at the tail of the snapshot queue. When the production file system is restored with a snapshot, the meta bit map of the production volume is replaced with the meta bit map of the snapshot.

It is also desired to maintain a respective meta bit map for each snapshot in a system where data blocks in the production file system can be invalidated concurrent with read-write operations upon the production file system, in order to save data blocks being invalidated in the production file system if these data blocks might be needed to support existing snapshots. For example, these data blocks can be copied from the clone volume to the save volume at the tail of the queue at the time of invalidation of the data blocks in the production file system, or alternatively and preferably, these data blocks are retained in the clone volume until new data is to be written to them in the clone volume. In this case, the meta bit maps for the snapshot views can be merged, as further described below with reference to FIGS. 35 to 36, in order to determine whether or not a data block in the clone volume should be copied to the save volume at the time of invalidation of the data block or just before new data is written to the data block in the clone volume.

As shown in FIG. 29, there is a meta bit map 78 linked to the snapped volume 35 for indicating invalid blocks in the clone volume 37. Each entry in the snapshot queue 70 includes a respective meta bit map linked to the delta volume in the entry. For example, the queue entry (J+K) at the tail 71 of the queue has a meta bit map 79 linked to the delta volume 36, and the queue entry (J) at the head 72 of the queue includes a meta bit map 80 linked to the delta volume 75.

Figure 30:
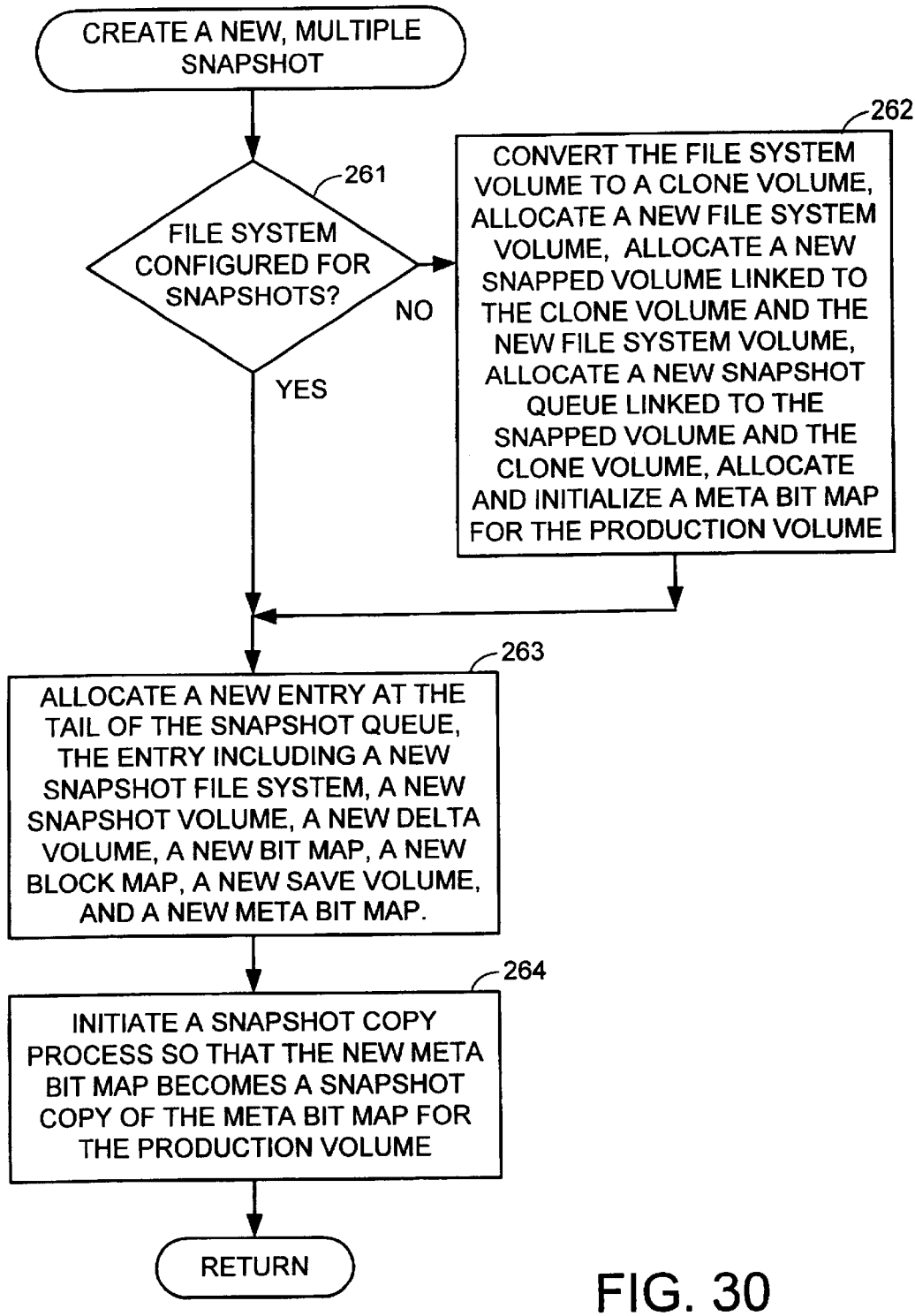
FIG. 30 is a flowchart of a procedure for creating a new snapshot in the multiple snapshot organization of FIG. 29.

FIG. 30 shows a procedure for creating a new, multiple snapshot when meta bit maps are used in the snapshot organization shown in FIG. 29. In a first step 261, execution branches to step 262 if the file system is not configured to support snapshots. In step 262, the file system volume is converted to a clone volume, a new file system volume is allocated, a new snap volume is allocated and linked to the clone volume and the new file system volume, a new snapshot queue is allocated and linked to the snap volume and the clone volume, and a meta bit map is allocated and initialized for the production volume. The queue allocated in step 262 is initially empty and therefore has no entries. Execution continues from step 262 to step 263. Execution also continues from step 261 to step 263 when the file system has already been configured to support snapshots.

In step 263, a new entry is allocated at the tail of the snapshot queue. The new entry includes a new snapshot volume, a new delta volume, a new bit map, a new block map, a new save volume, and a new meta bit map. In step 264, a snapshot copy process is initiated so that the new meta bit map becomes a snapshot copy of the meta bit map for the production volume. After step 264, the process of creating the new multiple snapshots has been completed, and execution returns.

Figure 31:
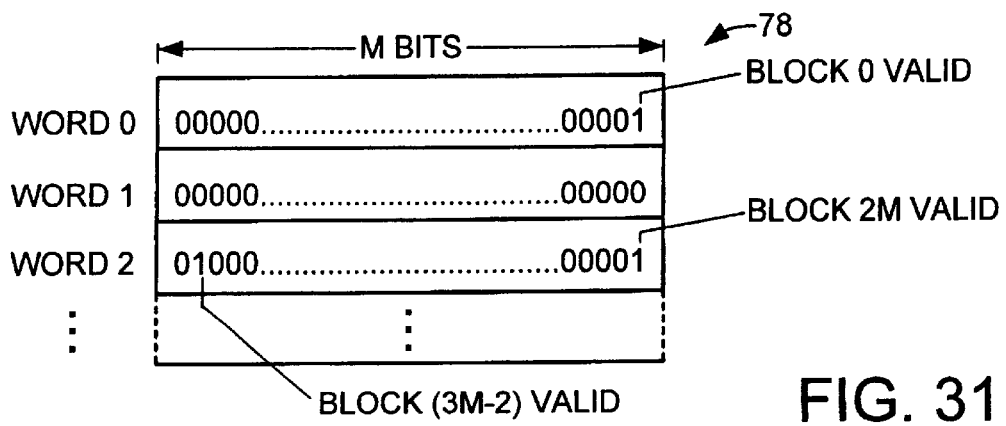
FIG. 31 shows a specific construction for and interpretation of the meta bit map for the production volume.

FIG. 31 shows that the meta bit map 78 has a respective bit corresponding to each block in the clone volume, and in this example, each bit in the meta bit map corresponds to one and only one block in the clone volume. The meta bit map 78 includes a series of words, each with a multiple of M bits. In this example, a bit having a value of zero indicates a corresponding block that is invalid, and a bit having a value of one indicates a corresponding block that is valid.

Figure 32:
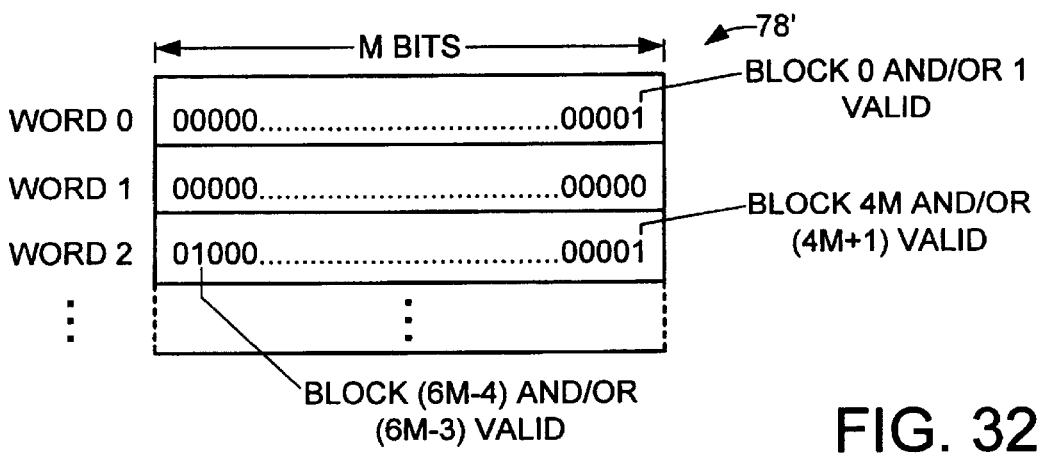
FIG. 32 shows an alternative interpretation of the meta bit map for the production volume.

The meta bit map, however, may have a granularity greater than one block per bit. For example, each bit in the meta bit map could indicate a range of block addresses, which may include at least some valid data. The benefit to the increase granularity is a reduced size of the meta bit map at the expense of sometimes saving invalid data to the save volume. For example, FIG. 32 shows the interpretation of a meta bit map 78' having a granularity of two blocks per bit. Each bit is set if any one of the two corresponding blocks is valid, or conversely, each bit is clear only if neither of the two corresponding blocks is valid. In this case, the block address can be converted to a bit address by an integer division by two, for example, by an arithmetic right shift of the block address by one bit position.

Figure 33:
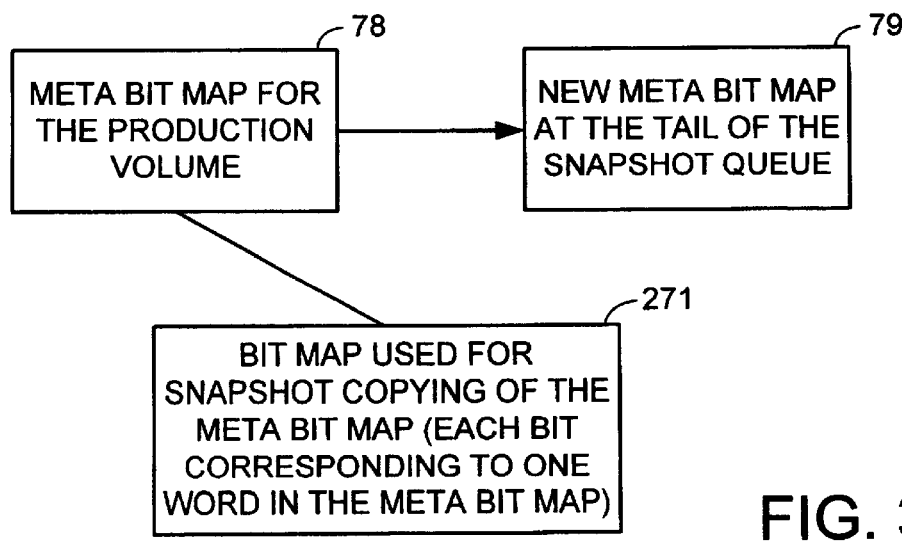
FIG. 33 shows the use of a bit map for snapshot copying of the meta bit map for the production volume.

FIG. 33 shows that still another bit map 271 is used for snapshot copying of the meta bit map for the production volume 78 to a new meta bit map 79 at the tail of the snapshot queue during the process of creating a new snapshot file system. In the bit map 271, each bit corresponds to one word in the meta bit map 78 or the meta bit map 79.

Figure 34:
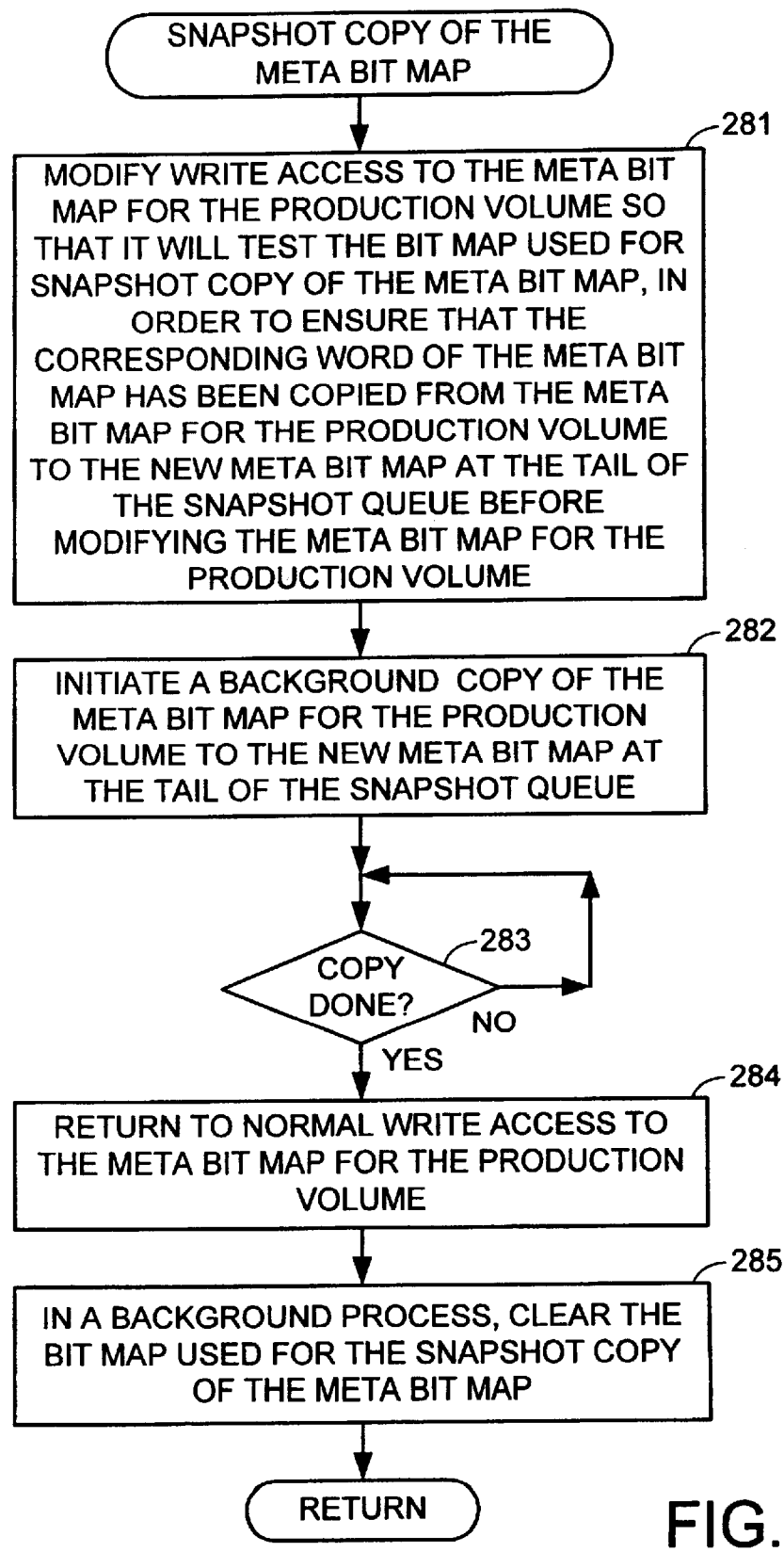
FIG. 34 is a flowchart of a procedure for snapshot copying of the meta bit map for the production volume.
Figure 35:
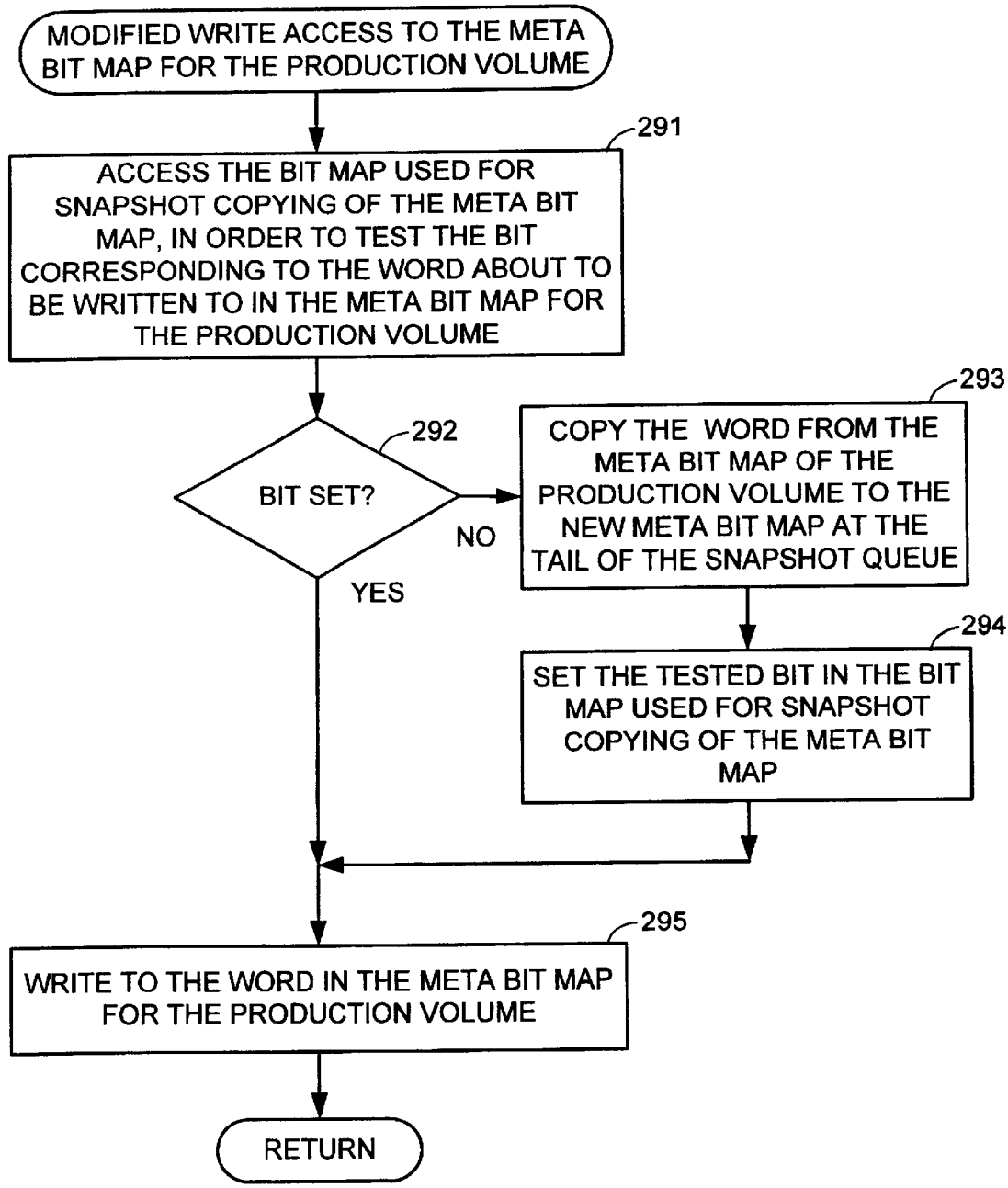
FIG. 35 is a flowchart of a procedure for modified write access to the meta bit map for the production volume when the meta bit map is being snapshot copied.

FIG. 34 shows a procedure for snapshot copying of the meta bit map. In a first step 281, any write access to the meta bit map for the production volume is modified, so that the write access will test the bit map used for snapshot copy of the meta bit map, in order to ensure that the corresponding word of the meta bit map has been copied from the meta bit map for the production volume to the new meta bit map at the tail of the snapshot queue before modifying the meta bit map for the production volume. For example, the write access to the meta bit map occurs in step 253 of FIG. 28. The write access is modified, for example, as shown in FIG. 35 as further described below. Execution continues from step 281 to step 282. In step 282, there is initiated a background process of copying the meta bit map for the production volume to the new meta bit map at the tail of the snapshot queue. In step 283, execution is stalled until the background copy is done. Once the background copy is done, execution continues to step 284. In step 284, there is a return to the normal write access to the meta bit map for the production volume. Then in step 285, in a background process, the bit map used for the snapshot copy of the meta bit map is cleared. Step 285 completes the process of snapshot copying of the meta bit map, and execution returns.

FIG. 35 shows the modified write access to the meta bit map for the production volume. In a first step 291, the bit map used for snapshot copying of the meta bit map is accessed, in order to test the bit corresponding to the word about to be written to in the meta bit map for the production volume. Then in step 292, if the tested bit is not set, execution branches to step 293. In step 293, the word from the meta bit map of the production volume is copied to the new meta bit map at the tail of the snapshot queue. Then step 294 sets the tested bit in the bit map used for snapshot copying of the meta bit map. Execution continues from step 294 to step 295. Execution also continues from step 292 to step 295 when the tested bit is set. Finally, in step 295, the write access is completed by writing to the word in the meta bit map for the production volume, and execution returns.

Figure 36:
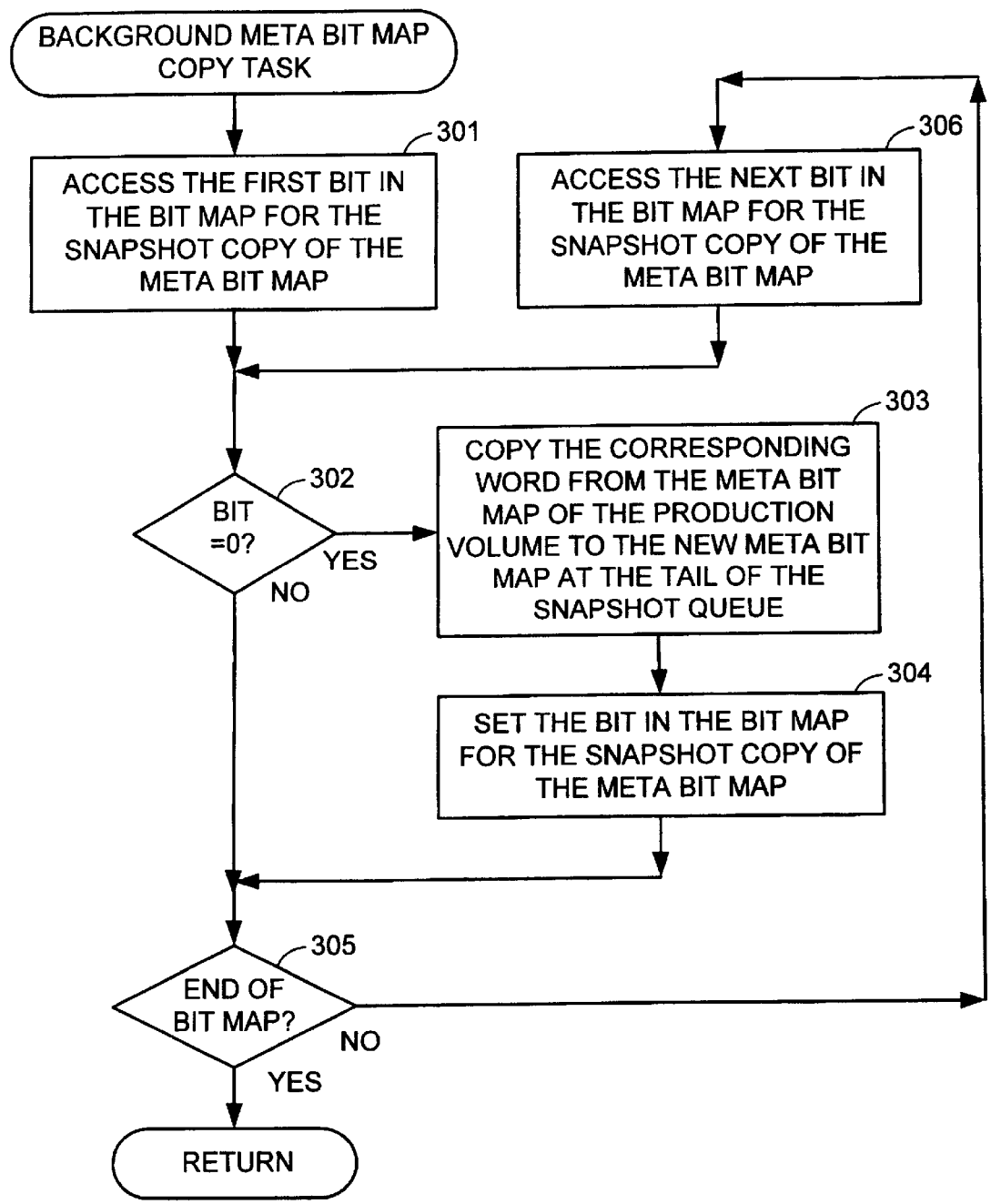
FIG. 36 is a flowchart of a procedure for a background meta bit map copy task initiated in the procedure of FIG. 34.

FIG. 36 is a flowchart for the background meta bit map copy task introduced above in step 282 of FIG. 34. In a first step 301 of FIG. 36, the first bit is accessed in the bit map for the snapshot copy of the meta bit map (i.e., in the bit map 275 of FIG. 33). Then in step 302, if the accessed bit is equal to zero, execution branches to step 303. In step 303, the corresponding word is copied from the meta bit map of the production volume to the new meta bit map at the tail of the snapshot queue. Then in step 304, the bit is set in the bit map for the snapshot copy of the meta bit map. Execution continues from step 304 to step 305. Execution also continues from step 302 to step 305 if the accessed bit is not equal to zero. In step 305, if the end of the bit map for the snapshot copy of the meta bit map has not been reached, then execution branches to step 306. In step 306, the next bit is accessed in the bit map for the snapshot copy of the meta bit map. Execution loops back from step 306 to step 302. The process continues until the end of the bit map is reached in step 305, and execution returns.

In order for the meta bit map for the production volume to be used as described above in FIG. 28 for the decision of whether or not to copy from the clone volume to the save volume at the tail of the queue when writing to the production volume, it has been assumed that valid data blocks that are needed to support snapshot copies do not become invalidated simply because they are not needed any more for read access to the production volume. To provide the capability of invalidating blocks in the production file system and saving the contents of the blocks in this situation to support at least one snapshot file system, a merged meta bit map is used to indicate whether or not each block should be saved to support any of the snapshot volumes.

Figure 37:
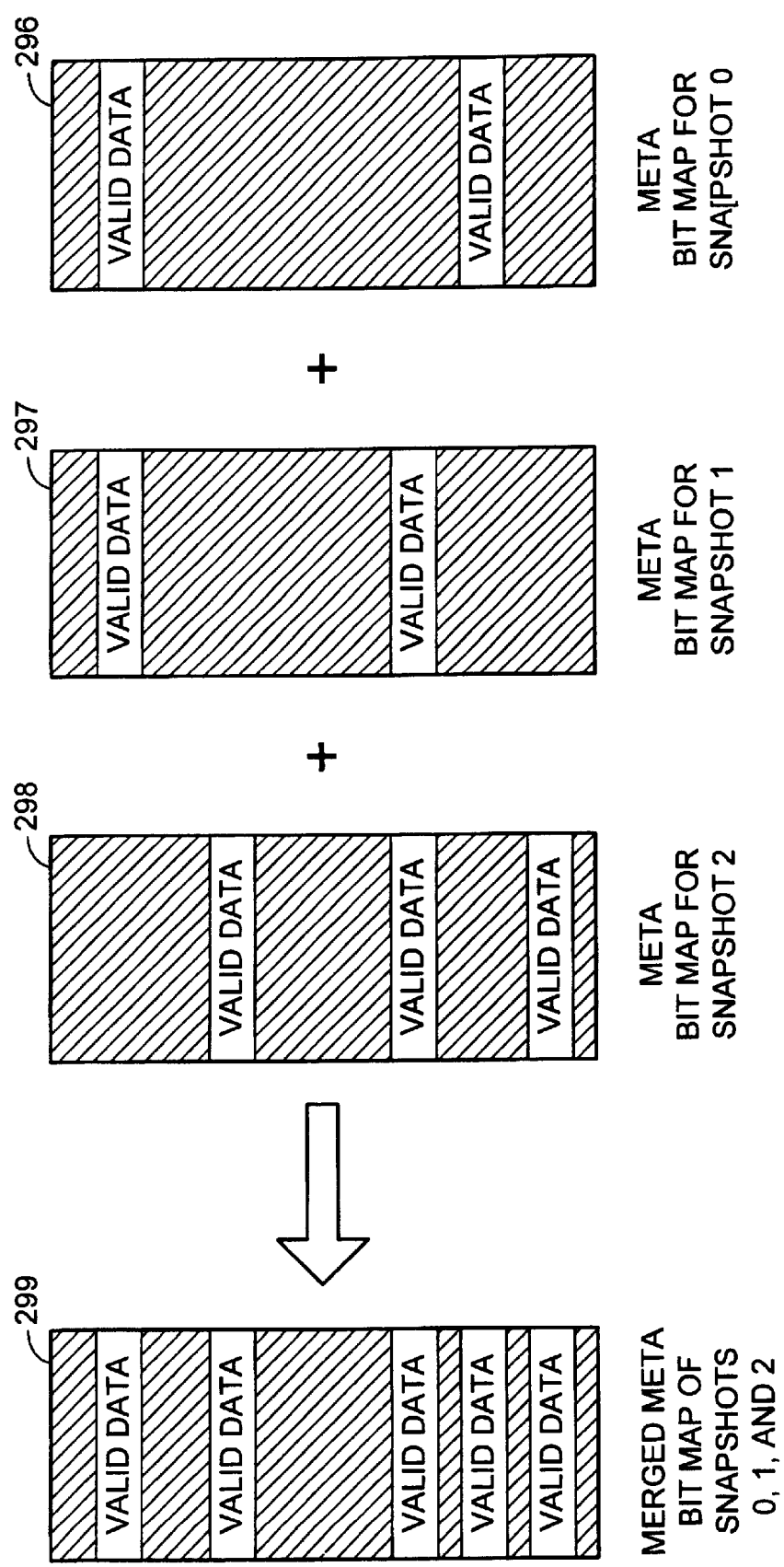
FIG. 37 is a block diagram showing an example of content of respective meta bit maps for three snapshots and a merged meta bit map of the snapshots.

FIG. 37 shows the concept of a merged meta bit map. In this example, the contents of a meta bit map 296 for a snapshot 0, a meta bit map 297 for a snapshot 1, and the contents of a meta bit map 298 for a snapshot 2 are combined to create a merged meta bit map of the snapshots 0, 1, and 2. The merged meta bit map provides a map of data blocks that contain data that is not invalid in any one of the snapshots 0, 1, or 2. If a logic 1 is used to indicate valid data, then the content of the merged meta bit map 299 is the logical OR of the content of the meta bit maps 296, 297, and 298 for the snapshots 0, 1, and 2. Alternatively, if a logic 0 is used to indicate valid data, then the content of the merged meta bit map 299 is the logical AND of the content of the merged meta bit maps 296, 297, and 298 for the snapshots 0, 1, and 2.

Figure 38:
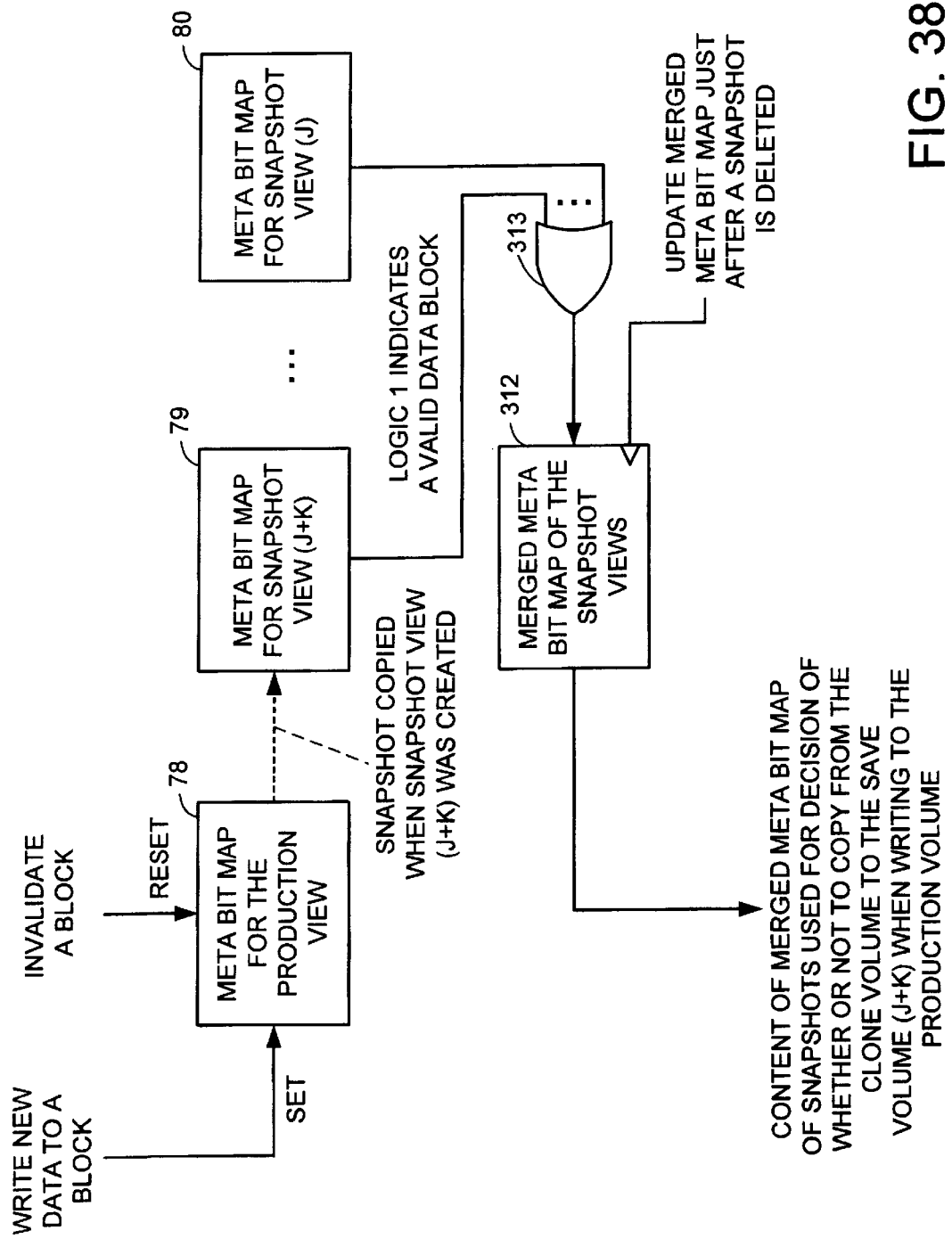
FIG. 38 is a logic diagram for maintenance of a merged meta bit map used for a decision of whether or not to copy from the clone volume to the save volume at the tail of the snapshot queue for an embodiment of the multiple snapshot copy facility in which blocks of the production file system can be dynamically invalidated concurrent with read/write access to the production volume.

In the example of FIG. 38, a logic 1 is used to indicate a valid data block, and a merged meta bit map 312 is maintained as the logical OR of corresponding bits in each of the meta bit map 79 for the snapshot view (J+K) at the tail of the queue, the meta bit map 80 for the snapshot view (J) at the head of the queue, and each of the K−2, if any, meta bit maps for the K−2 intermediate entries (not shown) in the snapshot queue. As further indicated in FIG. 38, when writing new data to a block in the clone volume, there is a setting of the corresponding bit in the meta bit map 78 for the production volume. When invalidating a block in the production volume, there is a resetting of the corresponding bit in the meta bit map 78 for the production volume. Moreover, just after a snapshot is deleted, the merged meta bit map 312 is updated. The content of the merged meta bit map 312 of the snapshots is used for the decision of whether or not to copy from the clone volume to the save volume (J+K) at the tail of the snapshot queue when writing to the production volume; e.g., in steps 251 and 252 of FIG. 28.

Figure 39:
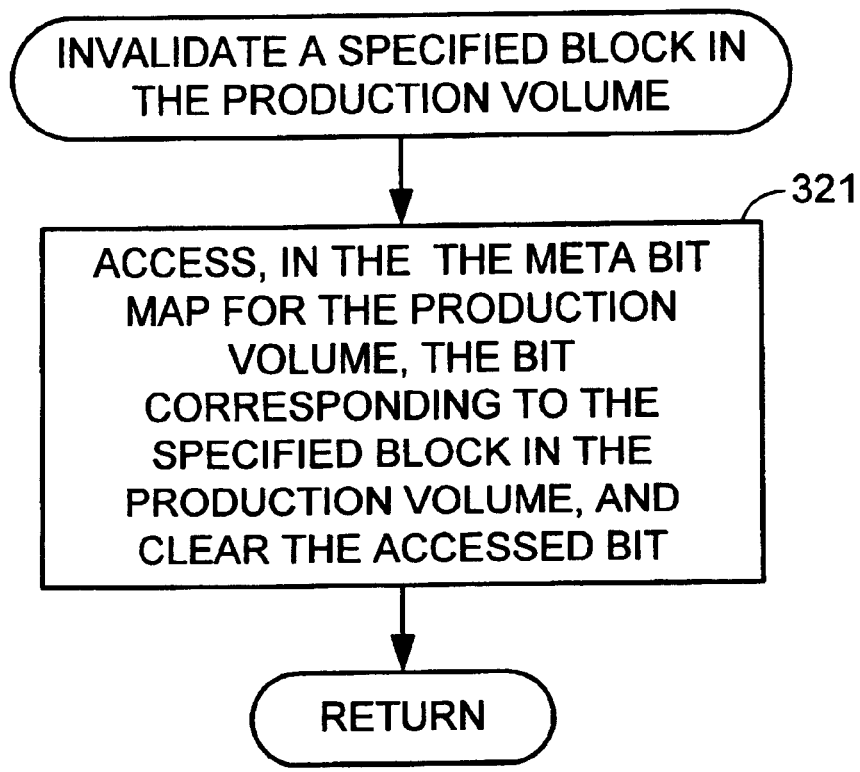
FIG. 39 is a flowchart of a procedure for invalidating a specified data block in the production volume.

FIG. 39 shows a procedure for invalidating a specified block in the production volume. In a first step 321, the bit corresponding to the specified block in the production volume is accessed in the meta bit map for the production volume, and the accessed bit is cleared. After step 321, execution returns.

Figure 40:
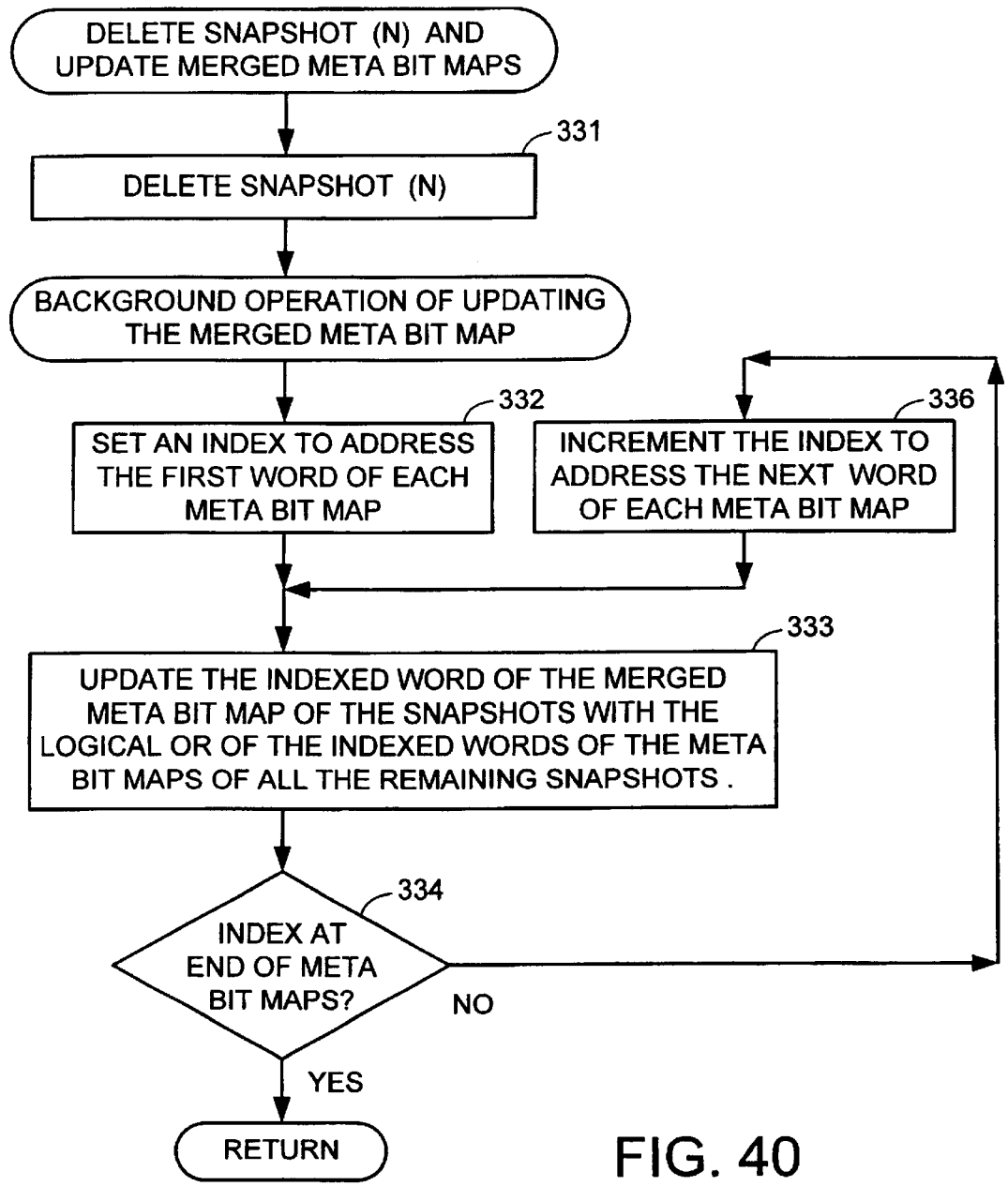
FIG. 40 is a flowchart for deleting a specified snapshot and updating the merged meta bit map of FIG. 35.

FIG. 40 shows a procedure for deleting a specified snapshot (N) and updating the merged meta bit maps. In a first step 331, the specified snapshot is deleted, for example, by using the procedure of FIG. 15. Then a background operation of updating the merged meta bit maps is started. In step 332 an index is set to address the first word of each meta bit map. In step 333 the indexed word of the merged meta bit map of the snapshots is updated with the logical OR of the indexed words of all of the remaining snapshots. Then in step 334, execution returns if the index is at the end of the meta bit maps. Otherwise, execution branches from step 334 to step 336 to increment the index to address the next word of each meta bit map. Execution loops back from step 336 to step 333.

In view of the above, there has been described a file server providing read-only access to multiple snapshot file systems, each being the state of a production file system at a respective point in time when the snapshot file system was created. The snapshot file systems can be deleted or refreshed out of order. The production file system can be restored instantly from any specified snapshot file system. The blocks of storage for the multiple snapshot file systems are intermixed on a collective snapshot volume. The extent of the collective snapshot volume is dynamically allocated and automatically extended as needed.

In the preferred implementation, the storage of the file server contains only a single copy of each version of data for each data block that is in the production file system or in any of the snapshot file systems. Unless modified in the production file system, the data for each snapshot file system is kept in the storage for the production file system. In addition, invalid data is not kept in the storage for the snapshot file systems. This minimizes the storage and memory requirements, and increases performance during read/write access concurrent with creation of the snapshot file systems, and during restoration of the production file system from any specified snapshot concurrent with read/write access to the restored production file system.

It should be appreciated that the invention has been described with respect to a file server, but the invention is also applicable generally to other kinds of data storage systems which store datasets in formats other than files and file systems. For example, the file system layer 25 in FIGS. 14 or 29 could be replaced with a different layer for managing the particular dataset format of interest, or an application program or host processor could directly access the volume layer 26. In any case, the particular dataset format or application would be supported by the objects and at least the lower-level storage volumes in the volume layer 26.

What is claimed is:

1. A data storage system for providing access to a production dataset and at least one snapshot dataset, said at least one snapshot dataset being the state of the production dataset at a point in time when said at least one snapshot dataset was created, the data storage system comprising storage for storing data of the production dataset and said at least one snapshot dataset, wherein the data storage system is programmed for maintaining an indication of invalid blocks of the storage that are allocated to the production dataset, and the data storage system is programmed for performing a write access upon a specified block of the storage allocated to the production dataset by checking whether or not the specified block is indicated to be invalid, and if the specified block is not indicated to be invalid, copying the specified block to said at least one snapshot dataset and then writing to the specified block, and if the specified block is indicated to be invalid, writing to the specified block without copying the specified block to said at least one snapshot dataset.

2. The data storage system as claimed in claim 1, wherein the data storage system is programmed for initially indicating each block of the production dataset as invalid when said each block is allocated to the production dataset but not yet written to, and for changing the indication for said each data block to indicate said each block as not invalid when said each block is written to.

3. The data storage system as claimed in claim 2, wherein the data storage system is programmed for responding to a request for invalidating at least one specified block of the production dataset concurrent with read/write access to the production dataset, and in response, setting the indication of invalid blocks of the storage that are allocated to the production dataset so as to indicate that said at least one specified block of the production dataset is invalid.

4. The data storage system as claimed in claim 1, wherein the data storage system is programmed for maintaining a meta bit map including the indication of invalid blocks of storage that are allocated to said at least one production dataset, the meta bit map being addressable with at least a portion of an address of the specified block to provide a respective bit for signaling whether the specified block is indicated as invalid.

5. The data storage system as claimed in claim 4, wherein each bit in the meta bit map provides an invalidity indication for a respective one and only one block of the storage allocated to the production dataset.

6. The data storage system as claimed in claim 4, wherein each bit in the meta bit map provides an invalidity indication for a respective group of a plurality of blocks of the storage allocated to the production dataset, said each bit indicating that the respective group is invalid only if all of the blocks in the respective group are invalid, and indicating that the respective group is valid if any one of the blocks in the respective the group is not invalid.

7. The data storage system as claimed in claim 1, wherein the data storage system is programmed for maintaining multiple snapshot datasets, each snapshot dataset being the state of the production dataset at a respective point in time when said each snapshot dataset was created, and for maintaining, for each snapshot dataset, a respective indication of the blocks of storage of the production dataset indicated as invalid at the respective time when said each snapshot dataset was created.

8. The data storage system as claimed in claim 7, wherein the data storage system is programmed for maintaining said respective indication for said each snapshot dataset by producing a respective snapshot copy of said indication of invalid blocks of the storage that are allocated to the production dataset as indicated at the respective point in time when the snapshot dataset was created.

9. The data storage system as claimed in claim 8, wherein the data storage system is programmed for copying the specified block to storage for said each snapshot dataset before writing to the specified block if said respective indication for said each snapshot dataset does not indicate that said specified block is invalid for said each snapshot dataset.

10. The data storage system as claimed in claim 7, wherein the data storage system is programmed for merging the respective indications for the snapshot datasets for determining whether or not the specified block is not indicated as invalid for any of the snapshot datasets.

11. The data storage system as claimed in claim 10, wherein the data storage system is programmed for copying the specified block to storage for snapshot datasets before writing to the specified block if the specified block is not indicated as invalid for any of the snapshot datasets.

12. A data storage system for providing access to a production dataset and a plurality of snapshot datasets, each snapshot dataset being the state of the production dataset at a point in time when the snapshot dataset was created, the data storage system comprising storage for storing data of the production dataset and the snapshot datasets, wherein the data storage system is programmed for maintaining an indication of invalid blocks of the storage that are allocated to the production dataset, and for maintaining, for said each snapshot dataset, a snapshot copy of the indication of invalid blocks of the storage that were allocated to the production dataset at the point of time when said each snapshot dataset was created, and the data storage system is programmed for performing a write access upon a specified block of the storage allocated to the production dataset by checking whether or not the specified block is not indicated to be invalid in any of the snapshot copies of the indication of invalid blocks that were allocated to the production dataset at the point in time when said each snapshot dataset was created, and if the specified block is not indicated to be invalid in any of the snapshot copies of the indication of invalid blocks that were allocated to the production dataset at the point in time when said each snapshot dataset was created, copying the specified block to at least the most recent snapshot dataset and then writing to the specified block, and if the specified block is indicated to be invalid in the production dataset and in all of the snapshot copies of the indication of invalid blocks that were allocated to the production dataset at the point in time when said each snapshot dataset was created, writing to the specified block without copying the specified block to said at least the most recent snapshot dataset.

13. The data storage system as claimed in claim 12, wherein the data storage system is programmed for initially indicating each block of the production dataset as invalid when said each block is allocated to the production dataset but not yet written to, and for changing the indication for said each block to indicate said each block as not invalid when said each block is written to.

14. The data storage system as claimed in claim 13, wherein the data storage system is programmed for responding to a request for invalidating at least one specified block of the production dataset concurrent with read/write access to the production dataset, and in response, setting the indication of invalid blocks of the storage that are allocated to the production dataset so as to indicate that said at least one specified block of the production dataset is invalid.

15. The data storage system as claimed in claim 12, wherein the data storage system is programmed for maintaining a meta bit map for the production dataset, the meta bit map including the indication of invalid blocks of storage that are allocated to the production dataset, the meta bit map being addressable with at least a portion of an address of the specified block to provide a respective bit for signaling whether the specified block is indicated as invalid.

16. The data storage system as claimed in claim 15, wherein each bit in the meta bit map provides an invalidity indication for a respective one and only one block of the storage allocated to the production dataset.

17. The data storage system as claimed in claim 16, wherein each bit in the meta bit map provides an invalidity indication for a respective group of a plurality of blocks of the storage allocated to the production dataset, said each bit indicating that the respective group is invalid only if all of the blocks in the respective group are invalid, and indicating that the respective group is not invalid if any one of the blocks in the respective group is valid.

18. The data storage system as claimed in claim 15, wherein the data storage system is programmed for keeping a respective snapshot copy of the meta bit map for the production dataset for said each snapshot dataset, and the data storage system is programmed for maintaining a merged meta bit map which is a merging of the respective snapshot copies of the meta bit map for the production dataset for the snapshot datasets, the merged meta bit map indicating whether the specified block is not indicated to be invalid in any of the snapshot copies of the indication of invalid blocks that were allocated to the production dataset at the point in time when said each snapshot dataset was created.

19. The data storage system as claimed in claim 18, wherein the data storage system is programmed for updating the merged meta bit map when any one of the snapshot datasets is deleted.

20. A data storage system for providing access to a production dataset and a plurality of snapshot datasets, each snapshot dataset being the state of the production dataset at a point in time when the snapshot dataset was created, the data storage system comprising storage for storing data of the production dataset and the snapshot datasets, wherein the data storage system is programmed for maintaining a meta bit map indicating invalid blocks of the storage that are allocated to the production dataset, and for maintaining, for said each snapshot dataset, a snapshot copy of the meta bit map indicating invalid blocks of the storage that were allocated to the production dataset at the point of time when said each snapshot dataset was created, and wherein the data storage system is programmed for using the snapshot copies of the meta bit map for deciding whether or not to copy blocks from the storage of the production dataset to storage of the snapshot datasets for saving the blocks to support the snapshot datasets.

21. The data storage system as claimed in claim 20, wherein the data storage system is programmed for merging the snapshot copies of the meta bit map in order to produce a merged meta bit map for indicating blocks that should be saved to support the snapshot datasets.

22. The data storage system as claimed in claim 21, wherein the data storage system is programmed to update the merged meta bit map when a snapshot dataset is deleted.

23. The data storage system as claimed in claim 21, wherein the data storage system is programmed for accessing the merged meta bit map for deciding whether or not to copy original data of a block of storage of the production dataset to storage of the snapshot datasets when writing new data to the block of storage of the production dataset.

24. A method of operating a data storage system for providing access to a production dataset and at least one snapshot dataset, said at least one snapshot dataset being the state of the production dataset at a point in time when said at least one snapshot dataset was created, the data storage system including storage for storing data of the production dataset and said at least one snapshot dataset, said method comprising:

maintaining an indication of invalid blocks of the storage that are allocated to the production dataset, and performing a write access upon a specified block of the storage allocated to the production dataset by checking whether or not the specified block is indicated to be invalid, and if the specified block is not indicated to be invalid, copying the specified block to said at least one snapshot dataset and then writing to the specified block, and if the specified block is indicated to be invalid, writing to the specified block without copying the specified block to said at least one snapshot dataset.

25. The method as claimed in claim 24, which includes initially indicating each block of the production dataset as invalid when said each block is allocated to the production dataset but not yet written to, and changing the indication for said each data block to indicate said each block as not invalid when said each block is written to.

26. The method as claimed in claim 25, which includes responding to a request for invalidating at least one specified block of the production dataset concurrent with read/write access to the production dataset, and in response, setting the indication of invalid blocks of the storage that are allocated to the production dataset so as to indicate that said at least one specified block of the production dataset is invalid.

27. The method as claimed in claim 24, which includes maintaining a meta bit map including the indication of invalid blocks of storage that are allocated to the production dataset, and addressing the meta bit map with at least a portion of an address of the specified block to provide a respective bit for signaling whether the specified block is indicated as invalid.

28. The method as claimed in claim 27, wherein each bit in the meta bit map provides an invalidity indication for a respective one and only one block of the storage allocated to the production dataset.

29. The method as claimed in claim 27, wherein each bit in the meta bit map provides an invalidity indication for a respective group of a plurality of blocks of the storage allocated to the production dataset, said each bit indicating that the respective group is invalid only if all of the blocks in the respective group are invalid, and indicating that the respective group is valid if any one of the blocks in the respective the group is not invalid.

30. The method as claimed in claim 24, which includes maintaining multiple snapshot datasets, each snapshot dataset being the state of the production dataset at a respective point in time when said each snapshot dataset was created, and maintaining, for each snapshot dataset, a respective indication of the blocks of storage of the production dataset indicated as invalid at the respective time when said each snapshot dataset was created.

31. The method as claimed in claim 30, which includes maintaining said respective indication for said each snapshot dataset by producing a respective snapshot copy of said indication of invalid blocks of the storage that are allocated to the production dataset as indicated at the respective point in time when the snapshot dataset was created.

32. The method as claimed in claim 31, which includes copying the specified block to storage for said each snapshot dataset before writing to the specified block if said respective indication for said each snapshot dataset does not indicate that said data block is invalid for said each snapshot dataset.

33. The method as claimed in claim 30, which includes merging the respective indications for the snapshot datasets for determining whether or not the specified block is not indicated as invalid for any of the snapshot datasets.

34. The method as claimed in claim 33, which includes copying the specified block to storage for snapshot datasets before writing to the specified block if the specified block is not indicated as invalid for any of the snapshot datasets.

35. A method of operating a data storage system for providing access to a production dataset and a plurality of snapshot datasets, each snapshot dataset being the state of the production dataset at a point in time when the snapshot dataset was created, the data storage system including storage for storing data of the production dataset and the snapshot datasets, said method comprising:

maintaining an indication of invalid blocks of the storage that are allocated to the production dataset, and maintaining, for said each snapshot dataset, a snapshot copy of the indication of invalid blocks of the storage that were allocated to the production dataset at the point of time when said each snapshot dataset was created, and performing a write access upon a specified block of the storage allocated to the production dataset by checking whether or not the specified block is not indicated to be invalid in any of the snapshot copies of the indication of invalid blocks that were allocated to the production dataset at the point in time when said each snapshot dataset was created, and if the specified block is not indicated to be invalid in any of the snapshot copies of the indication of invalid blocks that were allocated to the production dataset at the point in time when said each snapshot dataset was created, copying the specified block to at least the most recent snapshot dataset and then writing to the specified block, and if the specified block is indicated to be invalid in the production dataset and in all of the snapshot copies of the indication of invalid blocks that were allocated to the production dataset at the point in time when said each snapshot dataset was created, writing to the specified block without copying the specified block to said at least the most recent snapshot dataset.

36. The method as claimed in claim 35, which includes initially indicating each block of the production dataset as invalid when said each block is allocated to the production dataset but not yet written to, and changing the indication for said each block to indicate said each block as not invalid when said each block is written to.

37. The method as claimed in claim 36, which includes responding to a request for invalidating at least one specified block of the production dataset concurrent with read/write access to the production dataset, and in response, setting the indication of invalid blocks of the storage that are allocated to the production dataset so as to indicate that said at least one specified block of the production dataset is invalid.

38. The method as claimed in claim 35, which includes maintaining a meta bit map for the production dataset, the meta bit map including the indication of invalid blocks of storage that are allocated to the production dataset, the meta bit map being addressable with at least a portion of an address of the specified block to provide a respective bit for signaling whether the specified block is indicated as invalid.

39. The method as claimed in claim 38, wherein each bit in the meta bit map provides an invalidity indication for a respective one and only one block of the storage allocated to the production dataset.

40. The method as claimed in claim 39, wherein each bit in the meta bit map provides an invalidity indication for a respective group of a plurality of blocks of the storage allocated to the production dataset, said each bit indicating that the respective group is invalid only if all of the blocks in the respective group are invalid, and indicating that the respective group is not invalid if any one of the blocks in the respective the group is valid.

41. The method as claimed in claim 38, which includes keeping a respective snapshot copy of the meta bit map for the production dataset for said each snapshot dataset, and maintaining a merged meta bit map which is a merging of the respective snapshot copies of the meta bit map for the snapshot datasets, the merged meta bit map indicating whether the specified block is not indicated to be invalid in any of the snapshot copies of the indication of invalid blocks that were allocated to the production dataset at the point in time when said each snapshot dataset was created.

42. The method as claimed in claim 41, which includes updating the merged meta bit map when any one of the snapshot datasets is deleted.

43. A method of operating a data storage system for providing access to a production dataset and a plurality of snapshot datasets, each snapshot dataset being the state of the production dataset at a point in time when the snapshot dataset was created, the data storage system including storage for storing data of the production dataset and the snapshot datasets, said method comprising:

maintaining a meta bit map indicating invalid blocks of the storage that are allocated to the production dataset, and for maintaining, for said each snapshot dataset, a snapshot copy of the meta bit map indicating invalid blocks of the storage that were allocated to the production dataset at the point of time when said each snapshot dataset was created, and using the snapshot copies of the meta bit map for deciding whether or not to copy blocks from the storage of the production dataset to storage of the snapshot datasets for saving the blocks to support the snapshot datasets.

44. The method as claimed in claim 43, which includes merging the snapshot copies of the meta bit map in order to produce a merged meta bit map for indicating blocks that should be saved to support the snapshot datasets.

45. The method as claimed in claim 44, which includes updating the merged meta bit map when a snapshot dataset is deleted.

46. The method as claimed in claim 44, which includes accessing the merged meta bit map for deciding whether or not to copy original data of a block of storage of the production dataset to storage of the snapshot datasets when writing new data to the block of storage of the production dataset.

\* \* \* \* \*